United States Patent
Pallerla et al.

(10) Patent No.: US 11,645,865 B2
(45) Date of Patent: May 9, 2023

(54) RANDOMIZED MULTI-FINGERPRINT AUTHENTICATION

(71) Applicant: QUALCOMM Incorporated, San Diego, CA (US)

(72) Inventors: Rakesh Pallerla, Hyderabad (IN); Naga Chandan Babu Gudivada, Hyderabad (IN); Prakash Tiwari, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 58 days.

(21) Appl. No.: 17/249,551

(22) Filed: Mar. 4, 2021

(65) Prior Publication Data

US 2022/0284212 A1    Sep. 8, 2022

(51) Int. Cl.
*G06V 40/12*    (2022.01)
*G06V 40/13*    (2022.01)
(Continued)

(52) U.S. Cl.
CPC ............ *G06V 40/1365* (2022.01); *G06F 3/14* (2013.01); *G06V 40/1306* (2022.01);
(Continued)

(58) Field of Classification Search
CPC ........... G06V 40/1365; G06V 40/1306; G06V 40/1318; G06V 40/50; G06V 40/67; G06F 3/14
See application file for complete search history.

(56) References Cited

U.S. PATENT DOCUMENTS 5,815,252 A * 9/1998 Price-Francis ......... G07C 9/257
382/116
6,393,139 B1   5/2002 Lin et al.
(Continued)

FOREIGN PATENT DOCUMENTS

CA      3015041 C    7/2019
CN   103400436 A   11/2013
(Continued)

OTHER PUBLICATIONS

International Search Report and Written Opinion—PCT/US2022/070211—ISA/EPO—dated Apr. 5, 2022.
(Continued)

*Primary Examiner* — Edward F Urban
*Assistant Examiner* — Wassim Mahrouka
(74) *Attorney, Agent, or Firm* — Qualcomm Incorporated

(57) ABSTRACT

Some disclosed methods involve randomly or pseudo-randomly selecting one fingerprint authentication case from a plurality of fingerprint authentication cases stored in a memory, each of the fingerprint authentication cases corresponding to one or more fingerprints used during an authentication process, the fingerprint authentication cases including a plurality of multiple-fingerprint authentication cases for which two or more fingerprints are used during the authentication process. Upon determining that the selected fingerprint authentication case is a multiple-fingerprint authentication case, some methods involve controlling a display system to provide a multiple-fingerprint authentication graphical user interface (GUI) indicating at least two digit placement areas corresponding with a fingerprint sensor system area of a fingerprint sensor system, controlling the fingerprint sensor system to obtain fingerprint sensor data corresponding to each of the at least two digit place- (Continued)

ment areas and performing the authentication process based, at least in part, on the fingerprint sensor data.

38 Claims, 14 Drawing Sheets

(51) Int. Cl.
*G06V 40/60* (2022.01)
*G06V 40/50* (2022.01)
*G06F 3/14* (2006.01)

(52) U.S. Cl.
CPC .......... *G06V 40/1318* (2022.01); *G06V 40/50* (2022.01); *G06V 40/67* (2022.01)

(56) References Cited

U.S. PATENT DOCUMENTS

| | | | |
|---|---|---|---|
| 8,499,164 | B2 | 7/2013 | Ortiz et al. |
| 8,618,911 | B2 | 12/2013 | Adams et al. |
| 10,222,828 | B2 | 3/2019 | Magi |
| 2012/0076369 | A1* | 3/2012 | Abramovich ...... G06V 40/1312 382/126 |
| 2014/0079300 | A1 | 3/2014 | Wolfer et al. |
| 2014/0219520 | A1* | 8/2014 | Myers ................. G06V 10/772 382/124 |
| 2016/0328597 | A1* | 11/2016 | Abiko .................... G06F 3/041 |
| 2018/0276356 | A1 | 9/2018 | Kim |
| 2019/0114407 | A1* | 4/2019 | Liu ........................... H04L 9/40 |
| 2020/0242328 | A1* | 7/2020 | Chung ............... G06V 40/1365 |
| 2021/0049392 | A1* | 2/2021 | Juncker ................. G06V 40/67 |
| 2021/0166047 | A1* | 6/2021 | Juncker ............. G06V 40/1365 |

FOREIGN PATENT DOCUMENTS

| | | |
|---|---|---|
| CN | 103927658 A | 7/2014 |
| CN | 105637533 B | 8/2017 |
| EP | 3468134 A1 | 4/2019 |
| WO | WO2017/064097 A1 | 4/2017 |

OTHER PUBLICATIONS

Gafurov, D., et al., "Fusion in fingerprint authentication: two finger scenarios," 2010 Sixth International Conference on Intelligent Information Hiding and Multimedia Signal Processing, 2010, pp. 356-359, <<DOI 10.1109/IIHMSP.2010.93>>.

Joshi, M., et al., "Security vulnerabilities against fingerprint biometric system," arXiv: 1805.07116v1 [cs.CR] May 18, 2018, pp. 1-27. <<https://doi.org/10.48550/arXiv.1805.07116>>.

Burt, C., "Huawei could bring full-display fingerprint biometrics to mobile devices," Biometricupdate.com, Aug. 11, 2020, 3 pp., retrieved Dec. 29, 2022, <<https://www.biometricupdate.com/202008/huawei-could-bring-full-display-fingerprint-biometrics-to-mobile-devices>>.

"Qualcomm unveils new generation 3D Sonic Max fingerprint sensor with 17x larger surface area," Mudit, Dec. 6, 2019, 2 pp., retrieved Dec. 29, 2022. <<https://www.techquila.co.in/qualcomm-new-generation-3d-sonic-max-fingerprint-sensor/>>.

Li, S., et al., "Fingerprint combination for privacy protection," IEEE Transactions on Information Forensics and Security, vol. 8, No. 2, Feb. 2013, pp. 350-360.

Low, C., "Qualcomm's larger in-screen fingerprint sensor could seriously improve security," Engadget, Dec. 3, 2019, 4 pp., retrieved Dec. 29, 2022. <<https://www.engadget.com/2019-12-03-qualcomm-3d-sonic-max-worlds-largest-in-display-fingerprint-sensor-specs-availability.html>>.

Nishiuchi, N., et al., "Biometric verification using the motion of fingers: a combination of physical and behavioural biometrics," Int. J. Biometrics, vol. 2, No. 3, 2010, pp. 222-235.

Suthar, P., et al. "Huawei files patent for full-screen fingerprint scanner," The TechComic, Aug. 19, 2020, 4 pp., retrieved Dec. 29, 2022. <<https://thethetechcomic.in/huawei-bringing-fullscreen-fingerprint-scanner/>>.

\* cited by examiner

| Hand Used | Authentication Cases | Fingers Used |
|---|---|---|
| Right | Case-1 | Thumb |
|  | Case-2 | Index Finger |
|  | Case-3 | Middle Finger |
|  | Case-4 | Ring Finger |
|  | Case-5 | Little Finger |
|  | Case-6 | Thumb and Index |
|  | Case-7 | Index and Middle |
|  | Case-8 | Middle and Ring |
|  | Case-9 | Ring and Little |

*Figure 4*

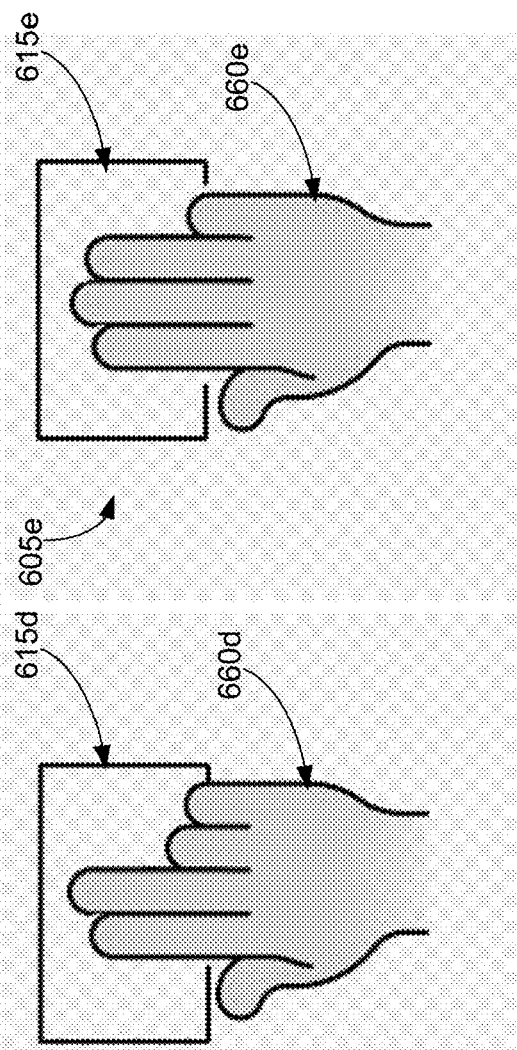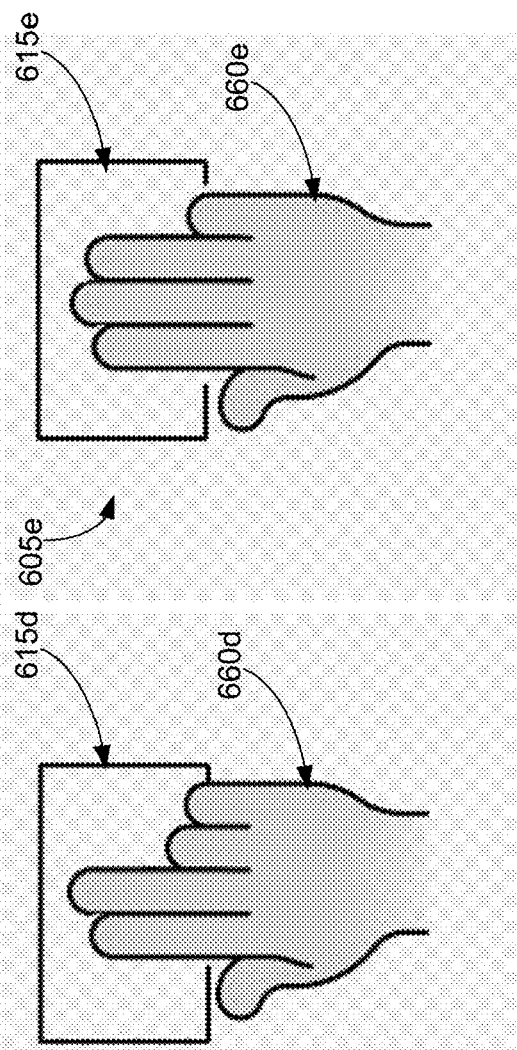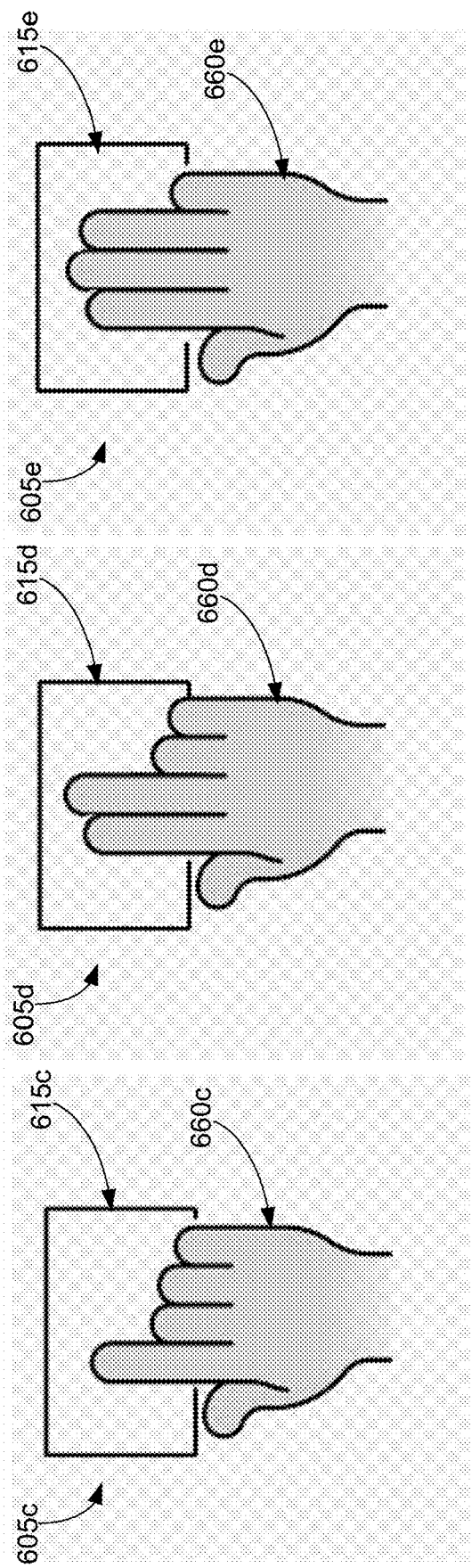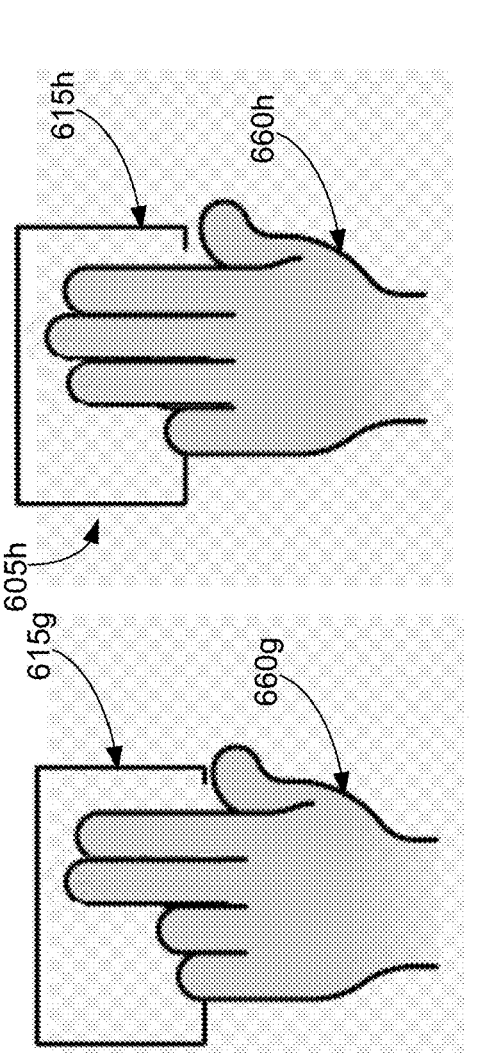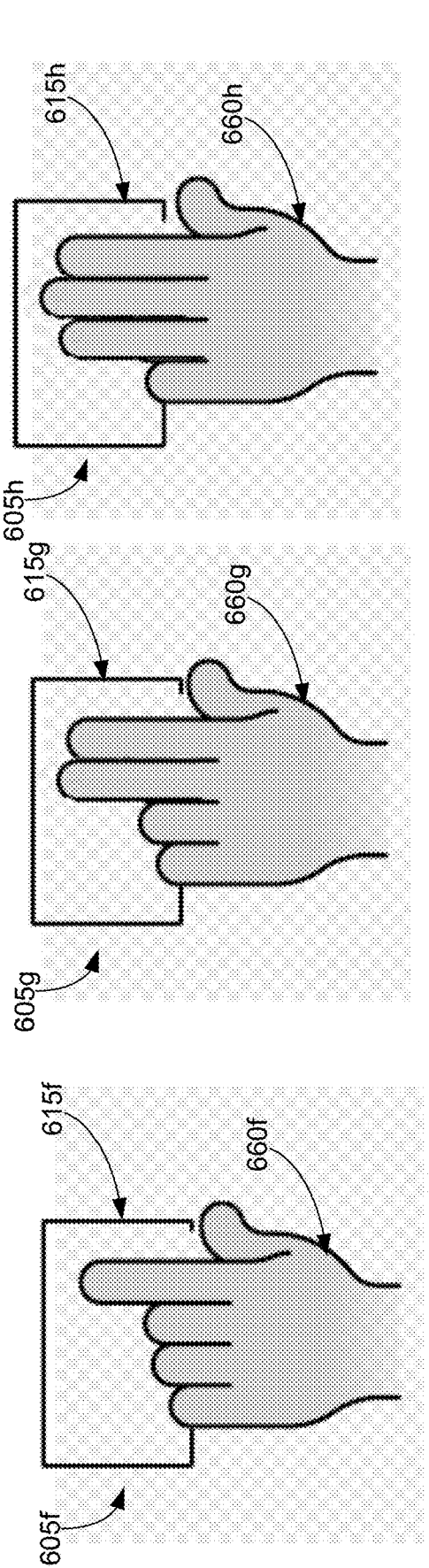

POSSIBLE Use Cases

NOT POSSIBLE

POSSIBLE Use Case

NOT POSSIBLE

POSSIBLE Use Cases

NOT POSSIBLE

POSSIBLE Use Case

NOT POSSIBLE

RANDOMIZED MULTI-FINGERPRINT AUTHENTICATION

TECHNICAL FIELD

This disclosure relates generally to fingerprint sensor devices and related methods, including but not limited to ultrasonic and optical fingerprint sensor systems and methods for using such systems.

DESCRIPTION OF THE RELATED TECHNOLOGY

Biometric authentication can be an important feature for controlling access to devices, etc. Many existing products include some type of biometric authentication. Although some existing biometric authentication technologies provide satisfactory performance under some conditions, improved methods and devices would be desirable.

SUMMARY

The systems, methods and devices of the disclosure each have several innovative aspects, no single one of which is solely responsible for the desirable attributes disclosed herein.

One innovative aspect of the subject matter described in this disclosure may be implemented in an apparatus. The apparatus may include a fingerprint sensor system, a display system including at least one display, a memory and a control system. In some examples, the control system may include the memory, whereas in other examples the control system may be configured for communication with a memory that is not part of the control system. According to some examples, the apparatus may be integrated into a mobile device. In some examples, at least part the control system is coupled (e.g. electrically or wirelessly coupled) to the fingerprint sensor system, the memory and the display system. The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof.

In some examples, the memory may be configured for storing fingerprint authentication cases. The fingerprint authentication cases may be based on fingerprints of individual digits and combinations of fingerprints from multiple digits obtained during an enrollment process. Each of the fingerprint authentication cases may correspond to one or more fingerprints used during an authentication process. The fingerprint authentication cases may include a plurality of multiple-fingerprint authentication cases for which two or more fingerprints are used during the authentication process. In some examples, the fingerprint authentication cases may include one or more single-fingerprint authentication cases.

According to some examples, the control system may be configured to randomly or pseudo-randomly select one of the fingerprint authentication cases and to determine whether a selected fingerprint authentication case is a multiple-fingerprint authentication case. In some examples, responsive to determining that the selected fingerprint authentication case is a multiple-fingerprint authentication case, the control system may be configured to control the display system to provide a multiple-fingerprint authentication graphical user interface (GUI). The multiple-fingerprint authentication GUI may, in some examples, indicate at least two digit placement areas corresponding with a fingerprint sensor system area.

In some examples, the control system may be configured to control the fingerprint sensor system to obtain fingerprint sensor data corresponding to each of the at least two digit placement areas. According to some examples, the control system may be configured to perform the authentication process based, at least in part, on the fingerprint sensor data.

According to some examples, the authentication process may involve a determination of relative digit placement, digit rotation, digit angular orientation, digit scaling, or combinations thereof. In some examples, the multiple-fingerprint authentication GUI may include digit information regarding which digit a user should place in each of the at least two digit placement areas. The digit information may, for example, include a digit identification label on or adjacent to each of the at least two digit placement areas. In some examples, the multiple-fingerprint authentication GUI may include hand information indicating a hand corresponding to digits a user should place in the at least two digit placement areas.

In some examples, the fingerprint sensor system area may be an ultrasonic fingerprint sensor area. In some such examples, the apparatus may include a cover glass proximate a first side of the at least one display. At least a portion of the ultrasonic fingerprint sensor area may be proximate a second side of the at least one display. The second side may be an opposite side relative to the first side. However, in some implementations the fingerprint sensor system may be, or may include, an optical fingerprint sensor system.

According to some examples, the control system may be configured to perform a hand determination process. The hand determination process may involve determining whether digits placed in the at least two digit placement areas correspond to a right hand or a left hand. According to some examples, the hand determination process may be based, at least in part, on the fingerprint sensor data corresponding to at least two digit placement areas. In some examples, the hand determination process may be based, at least in part, on inertial sensor data from an inertial sensor system.

In some examples, the control system may be configured to control the display system to provide one or more GUIs for a multiple-fingerprint enrollment process. In some such examples, at least one of the one or more GUIs for the multiple-fingerprint enrollment process may include a user interface for indicating a hand from which fingerprint sensor data will be obtained. In some examples, at least one of the one or more GUIs for the multiple-fingerprint enrollment process may include a user interface for identifying a digit from which fingerprint sensor data will be obtained or from which fingerprint sensor data has been obtained. According to some examples, at least one of the one or more GUIs for the multiple-fingerprint enrollment process may include at least two digit placement areas for simultaneously obtaining fingerprint sensor data from at least two digits.

According to some implementations, controlling the fingerprint sensor system to obtain the fingerprint sensor data may involve obtaining the fingerprint sensor data from target objects that are simultaneously presented in the at least two digit placement areas.

In some examples, the control system may be configured to use a randomly or pseudo-randomly selected fingerprint authentication case until after a successful authentication process involving the randomly or pseudo-randomly selected fingerprint authentication case. According to some implementations, the control system may be further configured to randomly or pseudo-randomly select another fingerprint authentication case during a subsequent authentication process after a successful authentication process.

According to some implementations, randomly or pseudo-randomly selecting fingerprint authentication cases may be part of an enhanced security authentication process. In some such examples, the control system may be configured for controlling the display system to provide a GUI for enabling or disabling the enhanced security authentication process.

Other innovative aspects of the subject matter described in this disclosure may be implemented in a method, such as an authentication method. In some examples, the method may involve randomly or pseudo-randomly selecting, by a control system, one fingerprint authentication case from a plurality of fingerprint authentication cases stored in a memory. Each of the fingerprint authentication cases may correspond to one or more fingerprints used during an authentication process. The fingerprint authentication cases may include a plurality of multiple-fingerprint authentication cases for which two or more fingerprints are used during the authentication process. The fingerprint authentication cases may be based on fingerprints of individual digits and combinations of fingerprints from multiple digits obtained during an enrollment process.

In some examples, the method may involve determining whether a selected fingerprint authentication case is a multiple-fingerprint authentication case. Responsive to determining that the selected fingerprint authentication case is a multiple-fingerprint authentication case, the method may involve controlling a display system to provide a multiple-fingerprint authentication GUI. The multiple-fingerprint authentication GUI may, for example, indicate at least two digit placement areas corresponding with a fingerprint sensor system area of a fingerprint sensor system. According to some examples, the method may involve controlling the fingerprint sensor system to obtain fingerprint sensor data corresponding to each of the at least two digit placement areas. In some examples, the method may involve performing the authentication process based, at least in part, on the fingerprint sensor data.

According to some examples, the authentication process may involve a determination of one or more of relative digit placement, digit rotation, digit angular orientation or digit scaling. In some examples, the multiple-fingerprint authentication GUI may include digit information regarding which digit a user should place in each of the at least two digit placement areas. According to some examples, the digit information may include a digit identification label on or adjacent to each of the at least two digit placement areas. In some examples, the multiple-fingerprint authentication GUI may include hand information indicating a hand corresponding to digits a user should place in the at least two digit placement areas.

In some examples, the method may involve performing a hand determination process. The hand determination process may involve determining whether digits placed in the at least two digit placement areas correspond to a right hand or a left hand. In some examples, the hand determination process may be based, at least in part, on the fingerprint sensor data corresponding to at least two digit placement areas. In some examples, the hand determination process may be based, at least in part, on inertial sensor data from an inertial sensor system.

According to some examples, controlling the fingerprint sensor system to obtain the fingerprint sensor data may involve obtaining the fingerprint sensor data from target objects that are simultaneously presented in the at least two digit placement areas.

In some examples, the method may involve continuing to use a randomly or pseudo-randomly selected fingerprint authentication case until after a successful authentication process involving the randomly or pseudo-randomly selected fingerprint authentication case. In some examples, the method may involve randomly or pseudo-randomly selecting another fingerprint authentication case during a subsequent authentication process after a successful authentication process.

According to some examples, randomly or pseudo-randomly selecting the fingerprint authentication case may be part of an enhanced security authentication process. In some such examples, the method further may involve controlling the display system to provide a GUI for enabling or disabling the enhanced security authentication process.

Some or all of the operations, functions and/or methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented in one or more non-transitory media having software stored thereon. For example, the software may include instructions for controlling one or more devices to perform a method.

In some examples, the method may involve randomly or pseudo-randomly selecting, by a control system, one fingerprint authentication case from a plurality of fingerprint authentication cases stored in a memory. Each of the fingerprint authentication cases may correspond to one or more fingerprints used during an authentication process. The fingerprint authentication cases may include a plurality of multiple-fingerprint authentication cases for which two or more fingerprints are used during the authentication process. The fingerprint authentication cases may be based on fingerprints of individual digits and combinations of fingerprints from multiple digits obtained during an enrollment process.

In some examples, the method may involve determining whether a selected fingerprint authentication case is a multiple-fingerprint authentication case. Responsive to determining that the selected fingerprint authentication case is a multiple-fingerprint authentication case, the method may involve controlling a display system to provide a multiple-fingerprint authentication GUI. The multiple-fingerprint authentication GUI may, for example, indicate at least two digit placement areas corresponding with a fingerprint sensor system area of a fingerprint sensor system. According to some examples, the method may involve controlling the fingerprint sensor system to obtain fingerprint sensor data corresponding to each of the at least two digit placement areas. In some examples, the method may involve performing the authentication process based, at least in part, on the fingerprint sensor data.

According to some examples, the authentication process may involve a determination of one or more of relative digit placement, digit rotation, digit angular orientation or digit scaling. In some examples, the multiple-fingerprint authentication GUI may include digit information regarding which digit a user should place in each of the at least two digit placement areas. According to some examples, the digit information may include a digit identification label on or adjacent to each of the at least two digit placement areas. In some examples, the multiple-fingerprint authentication GUI may include hand information indicating a hand corresponding to digits a user should place in the at least two digit placement areas.

In some examples, the method may involve performing a hand determination process. The hand determination process may involve determining whether digits placed in the at least two digit placement areas correspond to a right hand or a left hand. In some examples, the hand determination process may be based, at least in part, on the fingerprint sensor data corresponding to at least two digit placement areas. In some examples, the hand determination process may be based, at least in part, on inertial sensor data from an inertial sensor system.

According to some examples, controlling the fingerprint sensor system to obtain the fingerprint sensor data may involve obtaining the fingerprint sensor data from target objects that are simultaneously presented in the at least two digit placement areas.

In some examples, the method may involve continuing to use a randomly or pseudo-randomly selected fingerprint authentication case until after a successful authentication process involving the randomly or pseudo-randomly selected fingerprint authentication case. In some examples, the method may involve randomly or pseudo-randomly selecting another fingerprint authentication case during a subsequent authentication process after a successful authentication process.

According to some examples, randomly or pseudo-randomly selecting the fingerprint authentication case may be part of an enhanced security authentication process. In some such examples, the method further may involve controlling the display system to provide a GUI for enabling or disabling the enhanced security authentication process.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale. Like reference numbers and designations in the various drawings indicate like elements.

FIG. 4 shows a table of fingerprint authentication cases according to one example.

FIGS. 6C, 6D, 6E, 6F, 6G and 6H show additional examples of GUIs for single-fingerprint and multiple-fingerprint enrollment and/or authentication.

Figure 1:
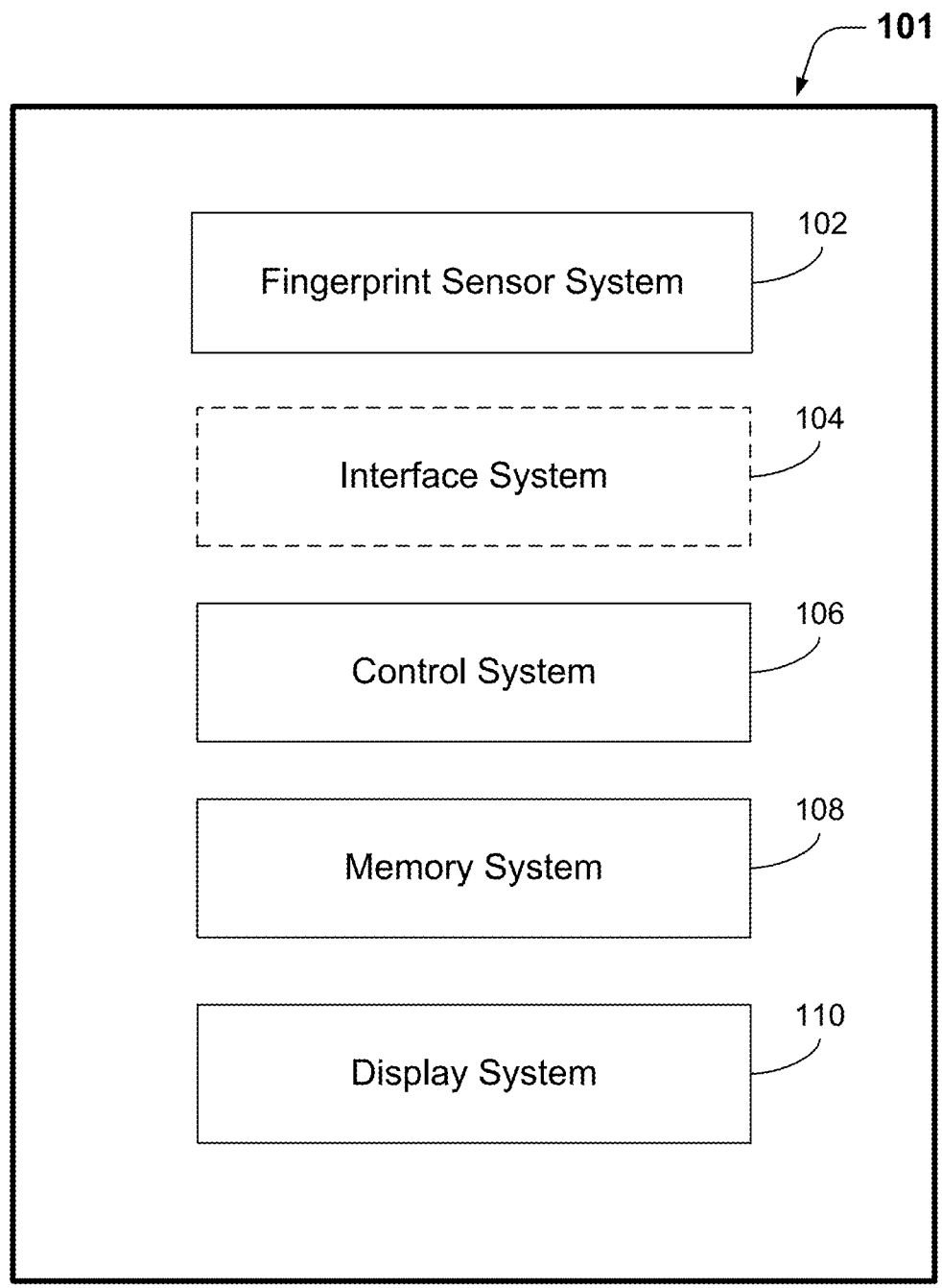
FIG. 1 is a block diagram that shows example components of an apparatus according to some disclosed implementations.

DETAILED DESCRIPTION he following description is directed to certain implementations for the purposes of describing the innovative aspects of this disclosure. However, a person having ordinary skill in the art will readily recognize that the teachings herein may be applied in a multitude of different ways. The described implementations may be implemented in any device, apparatus, or system that includes a biometric system as disclosed herein. In addition, it is contemplated that the described implementations may be included in or associated with a variety of electronic devices such as, but not limited to: mobile telephones, multimedia Internet enabled cellular telephones, mobile television receivers, wireless devices, smartphones, smart cards, wearable devices such as bracelets, armbands, wristbands, rings, headbands, patches, etc., Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), mobile health devices, computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also may be used in applications such as, but not limited to, electronic switching devices, radio frequency filters, sensors, accelerometers, gyroscopes, motion-sensing devices, magnetometers, inertial components for consumer electronics, parts of consumer electronics products, steering wheels or other automobile parts, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

Using a single fingerprint for authentication is now commonplace. (As used herein, the term "finger" may refer to any digit, including a thumb. Accordingly, a thumbprint will be considered a type of "fingerprint.") However, some previously-deployed fingerprint sensors may susceptible to false positive authentication due to one or more types of fingerprint spoofing, which generally involve the use of artificial fingerprints created using various materials and methods. Moreover, existing fingerprint sensors may be susceptible to false positive authentication due to latent fingerprints (in other words, fingerprints of an authorized user left on a surface by deposits of oils and other materials). As an example, existing fingerprint sensors can be tricked into accepting a latent fingerprint as a valid fingerprint, even when no actual finger or artificial finger is present.

Some disclosed devices are configured for multiple-fingerprint authentication methods. Some such methods involve a fingerprint authentication process in which a "fingerprint authentication case" is selected at random from a plurality of authentication cases. In some examples, each of the fingerprint authentication cases corresponds to one or more specific fingerprints used during the fingerprint authentication process. According to some implementations, one or more of the authentication cases may be multiple-fingerprint authentication cases for which two or more fingerprints are used during the authentication process. Some large-format fingerprint sensor systems may extend underneath a substantial portion (e.g., half or more) of a cell phone display area, allowing simultaneous scans of multiple digits during a multiple-fingerprint enrollment and/or authentication process. Some disclosed methods involve a fingerprint enrollment and/or authentication process in which fingerprint sensor data is obtained from two or more target objects (e.g., fingers) that are simultaneously presented in each of at least two digit placement areas. In some examples, the enrollment and/or authentication process may involve a determination of one or more of relative digit placement, digit rotation, digit angular orientation and/or digit scaling. Some such authentication processes may involve an evaluation of whether the relative digit placement, digit rotation, digit angular orientation and/or digit scaling is possible.

Particular implementations of the subject matter described in this disclosure may be implemented to realize one or more of the following potential advantages. Multiple-fingerprint authentication methods can potentially provide more secure authentication than single-fingerprint authentication methods, in part because creating multiple spoofs is relatively more difficult than creating one spoof. Randomized multiple-fingerprint authentication methods can provide enhanced security, particularly when implemented via a large-format fingerprint sensor system. Increased security may be provided by methods that involve determining whether a relative digit placement, digit rotation, digit angular orientation and/or digit scaling is possible. Moreover, the risk of accepting a latent fingerprint as a valid fingerprint may be reduced by the disclosed randomized multiple-fingerprint authentication methods, because fingerprint residue remaining from prior authentication attempts are unlikely to correspond with the randomly selected combination and/or position of fingerprints required for authentication.

FIG. 1 is a block diagram that shows example components of an apparatus according to some disclosed implementations. In this example, the apparatus 101 includes an fingerprint sensor system 102, a control system 106, a memory system 108 and a display system 110. In some implementations, the apparatus 101 may include an interface system 104.

According to some examples, the fingerprint sensor system 102 may be, or may include, an ultrasonic fingerprint sensor. Alternatively, or additionally, in some implementations the fingerprint sensor system 102 may be, or may include, an optical fingerprint sensor. For example, in some implementations the fingerprint sensor system 102 may be, or may include, an in-display optical fingerprint sensor of the type made commercially available by Synaptics, such as the Synaptics' Clear ID in-display fingerprint sensor. In other examples, the fingerprint sensor system 102 may be, or may include, an optical fingerprint sensor developed by the present assignee. In some examples, an ultrasonic version of the fingerprint sensor system 102 may include an ultrasonic receiver 103 and a separate ultrasonic transmitter 105. In some such examples, the ultrasonic transmitter 105 may include an ultrasonic plane-wave generator. However, various examples of ultrasonic fingerprint sensors are disclosed herein, some of which may include a separate ultrasonic transmitter 105 and some of which may not. For example, in some implementations, the fingerprint sensor system 102 may include a piezoelectric receiver layer, such as a layer of polyvinylidene fluoride PVDF polymer or a layer of polyvinylidene fluoride-trifluoroethylene (PVDF-TrFE) copolymer. In some implementations, a separate piezoelectric layer may serve as the ultrasonic transmitter. In some implementations, a single piezoelectric layer may serve as both a transmitter and a receiver. The fingerprint sensor system 102 may, in some examples, include an array of ultrasonic transducer elements, such as an array of piezoelectric micromachined ultrasonic transducers (PMUTs), an array of capacitive micromachined ultrasonic transducers (CMUTs), etc. In some such examples, PMUT elements in a single-layer array of PMUTs or CMUT elements in a single-layer array of CMUTs may be used as ultrasonic transmitters as well as ultrasonic receivers.

Data received from the fingerprint sensor system 102 may sometimes be referred to herein as "fingerprint sensor data," "fingerprint image data," etc., although the data will generally be received from the fingerprint sensor system in the form of electrical signals. Accordingly, without additional processing such image data would not necessarily be perceivable by a human being as an image.

The control system 106 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. In this example, the control system 106 is configured for communication with, and for controlling, the fingerprint sensor system 102 and the display system 110. According to some examples, the control system 106 may include a dedicated component for controlling the fingerprint sensor system 102. In this example, the control system 106 is also configured for communication with the memory system 108. According to some examples, the control system 106 also may include one or more memory devices, such as one or more random access memory (RAM) devices, read-only memory (ROM) devices, etc. In some implementations, functionality of the control system 106 may be partitioned between one or more controllers or processors, such as between a dedicated sensor controller and an applications processor of a mobile device.

In this example, the memory system 108 includes one or more memory devices, such as one or more RAM devices, ROM devices, etc. In some examples, the memory system 108 may include one or more computer-readable media, storage media and/or storage media. Computer-readable media include both computer storage media and communication media including any medium that may be enabled to transfer a computer program from one place to another. Storage media may be any available media that may be accessed by a computer. In some examples, the memory system 108 may include one or more non-transitory media. By way of example, and not limitation, non-transitory media may include RAM, ROM, electrically erasable programmable read-only memory (EEPROM), compact disc ROM (CD-ROM) or other optical disk storage, magnetic disk storage or other magnetic storage devices, or any other medium that may be used to store desired program code in the form of instructions or data structures and that may be accessed by a computer.

Some implementations of the apparatus 101 may include an interface system 104. In some examples, the interface system 104 may include a wireless interface system. In some implementations, the interface system 104 may include a user interface system, one or more network interfaces, one or more interfaces between the control system 106 and the fingerprint sensor system 102, one or more interfaces between the control system 106 and the memory system 108, one or more interfaces between the control system 106 and the display system 110, and/or one or more interfaces between the control system 106 and one or more external device interfaces (e.g., ports or applications processors).

The interface system 104 may be configured to provide communication (which may include wired or wireless communication, electrical communication, radio communication, etc.) between components of the apparatus 101. In some such examples, the interface system 104 may be configured to provide communication between the control system 106 and the fingerprint sensor system 102. According to some such examples, the interface system 104 may couple at least a portion of the control system 106 to the fingerprint sensor system 102, e.g., via electrically conducting material (e.g., via conductive metal wires or traces). According to some examples, the interface system 104 may be configured to provide communication between the apparatus 101 and other devices and/or human beings. In some such examples, the interface system 104 may include one or more user interfaces. The interface system 104 may, in some examples, include one or more network interfaces and/or one or more external device interfaces (such as one or more universal serial bus (USB) interfaces or a serial peripheral interface (SPI)).

In this implementation, the apparatus 101 includes a display system 110. In some such examples, the display system 110 may include layers, which may be referred to collectively as a "display stack." In some examples, the display system 110 may be, or may include, a light-emitting diode (LED) display, such as an organic light-emitting diode (OLED) display.

The apparatus 101 may be used in a variety of different contexts, some examples of which are disclosed herein. For example, in some implementations a mobile device may include at least a portion of the apparatus 101. In some implementations, a wearable device may include at least a portion of the apparatus 101. The wearable device may, for example, be a bracelet, an armband, a wristband, a ring, a headband or a patch. In some implementations, the control system 106 may reside in more than one device. For example, a portion of the control system 106 may reside in a wearable device and another portion of the control system 106 may reside in another device, such as a mobile device (e.g., a smartphone). The interface system 104 also may, in some such examples, reside in more than one device.

In some disclosed implementations, multiple digits may be enrolled during an enrollment phase, e.g., in response to a user's indication of a desire for a higher level of security. In some examples, individual digits may be enrolled separately, as well as combinations of two or more individually-enrolled digits. Alternatively, or additionally, combinations of fingerprints from multiple digits may be obtained simultaneously during the enrollment process. Multiple authentication cases may be based on the fingerprints of individual digits and combinations of fingerprints from multiple digits obtained during the enrollment process.

FIGS. 2A, 2B, 2C, 2D and 2E show examples of graphical user interfaces (GUIs) that may be presented during a multiple-digit enrollment process according to some implementations. In these examples, the GUIs are being presented on a display system 210 of an apparatus 101 according to instructions from a control system. In this example, the control system is an instance of the control system 106 of FIG. 1 and the display system 210 is an instance of the display system 110 of FIG. 1. As with other disclosed implementations, the particular arrangements of features, types of features and numbers of features that are shown in FIGS. 2A-2E are merely made by way of example. Moreover, as with other methods disclosed herein, the sequence of GUIs shown in FIGS. 2A-2E is merely an example. Other sequences of GUIs may include more or fewer GUIs than indicated.

Figure 2:
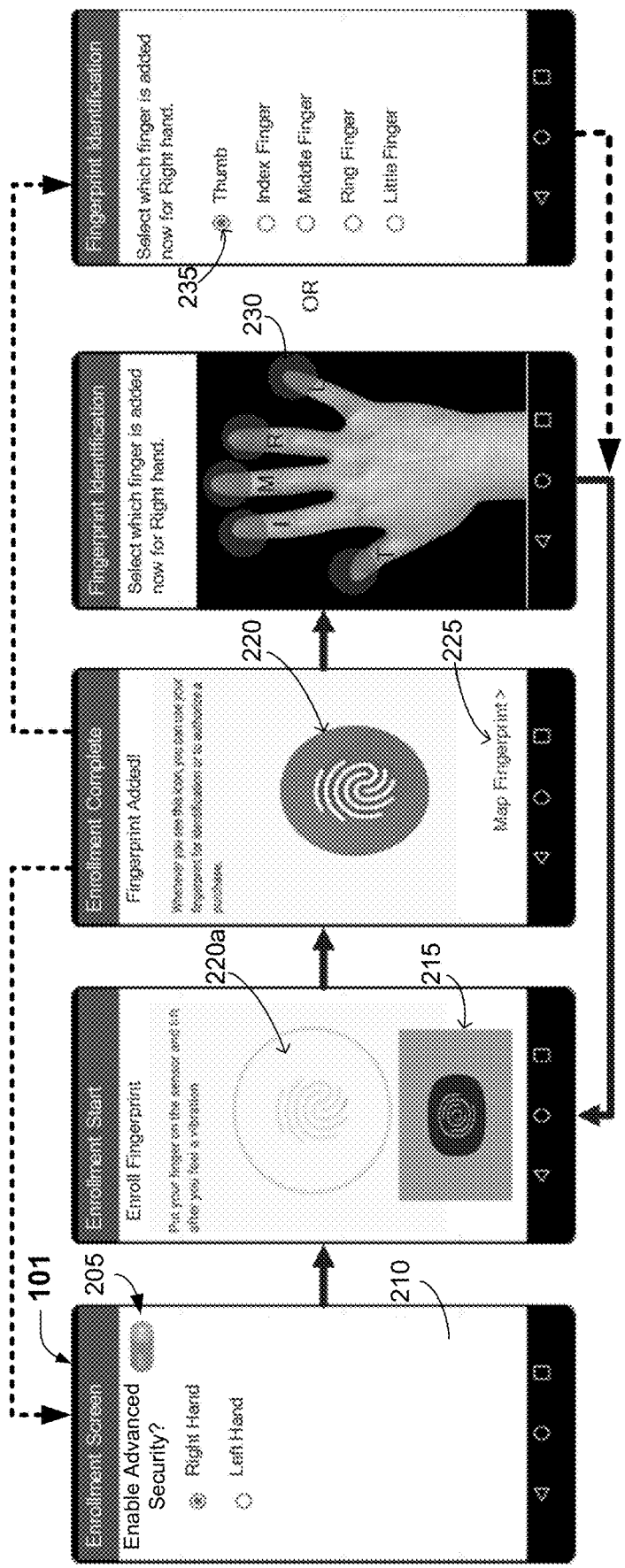
FIGS. 2A, 2B, 2C, 2D and 2E show examples of graphical user interfaces (GUIs) that may be presented during a multiple-digit enrollment according to some implementations.

In the example shown in FIG. 2A, the control system is controlling the display system 210 to present a GUI that includes an advanced security control 205 that is configured for receiving user input to enable or disable an enrollment process for enhanced security authentication. In some implementations, the control system may be configured for controlling the display system 210 to present a similar GUI for enabling or disabling the enhanced security authentication process after the enrollment process has been completed. According to this example, the GUI of FIG. 2A is configured to receive user input regarding whether fingerprints will be obtained from a right hand or a left hand during a particular stage of an enrollment process.

In this example, after the control system has received user input indicating that an enrollment process for enhanced security authentication should be enabled and indicating whether fingerprints will be obtained from a right hand or a left hand during an initial stage of the enrollment process, the control system is configured for controlling the display system 210 to present the GUI of FIG. 2B. According to this example, the apparatus 101 includes a haptic feedback system, which may be a component of the interface system 104 that is described above with reference to FIG. 1. In this implementation, the GUI of FIG. 2B includes a text prompt for the user to place a digit in a fingerprint sensor area 215 and to lift the digit after the user feels a vibration caused by the haptic feedback system. In this example, the fingerprint sensor area 215 corresponds to at least a portion of the fingerprint sensor system 102, which is not visible in FIGS. 2A-2E.

According to this implementation, the control system is configured to control the haptic feedback system to provide haptic feedback after the control system has received adequate fingerprint sensor data from the fingerprint sensor system 102. For example, the control system may be configured to determine whether the fingerprint sensor data received from the fingerprint sensor system 102 is at or above a quality metric threshold, such as a signal to noise ratio threshold, an image quality threshold, etc. In some examples, the control system may be configured to determine whether the fingerprint sensor data received from the fingerprint sensor system 102 includes a sufficiently large area of a digit surface, a sufficiently large percentage of a digit surface, a sufficiently large number of fingerprint minutiae, etc. In some implementations, a user may be prompted to position a digit so that various parts of the digit fingerprint are presented, e.g., by rolling the digit on a surface of the apparatus 101 proximate the fingerprint sensor area 215.

According to this example, the control system is also configured for controlling the display system 210 to present the GUI of FIG. 2C after the control system has received adequate fingerprint sensor data from the fingerprint sensor system 102. In this example, the GUI of FIG. 2C includes an icon 220 and explanatory text indicating that when the icon 220 is presented, a user may use a fingerprint for identification and/or to authorize a purchase. In some implementations, the control system may be configured for controlling the display system 210 to darken, brighten and/or change the shape of the icon 220*a* that is shown in the GUI of FIG. 2B in order to subsequently present the icon 220 that is shown in the GUI of FIG. 2C.

In this example, the GUI of FIG. 2C also includes an active textual prompt 225 with which a user may interact (e.g., by touching the textual prompt 225) in order to "map" the fingerprint obtained via the GUI of FIG. 2B to a particular digit. In this example, because a user had previously selected to enroll digits of the user's right hand via the GUI of FIG. 2A, if the control system determines (e.g., according to input from a touch sensor system of the apparatus 101) that a user has touched the active textual prompt 225, the control system is configured for controlling the display system 210 to present either the GUI of FIG. 2D or the GUI of FIG. 2E, with which the user may interact in order to specify the particular digit of the user's right hand from which finger image data was obtained.

The GUI of FIG. 2D shows examples of digit identification labels for each digit of a hand image. In this example, the digit identification labels are T, I, M, R and L, corresponding to a thumb, index finger, middle finger, ring finger and little finger, accordingly. As used herein, the terms "little finger" and "pinky finger" may be used interchangeably. The GUI of FIG. 2D includes circular areas 230, which a user may touch in order to select a corresponding digit of the right hand. The GUI of FIG. 2E presents thumb, index finger, middle finger, ring finger and little finger options in textual form. The GUI of FIG. 2E includes circular areas 235, which a user may touch in order to select a corresponding digit of the right hand. In some examples, one or more corresponding GUIs may be presented responsive to a user's selection of a left hand.

In this example, if the control system determines that there are additional digits of the right hand to be enrolled, the control system may be configured to present the GUI of FIG. 2B, or a modified version of the GUI of FIG. 2B, prompting the user to place another digit on the fingerprint sensor area 215. According to some implementations, after a user has enrolled all digits of one hand, the GUI of FIG. 2A may be presented again to that the user may select the other hand. In some alternative implementations, the user may automatically be prompted to enter a digit of the other hand without the need for the user to manually select the other hand.

However, the GUIs shown in FIGS. 2A-2E are not necessarily presented in the order indicated. For example, in some implementations the GUI of FIG. 2D or FIG. 2E may be presented after the GUI of FIG. 2A and before the GUI of FIG. 2B. This alternative sequence allows a digit to be identified prior to obtaining the corresponding fingerprint sensor data. According to some such implementations, after a user has enrolled all digits of one hand, the GUI of FIG. 2A may be presented after the GUI of FIG. 2C again so that the user may select the other hand. In some alternative implementations, the user may automatically be prompted to enter a digit of the other hand without the need for the user to manually select the other hand.

In some alternative implementations, one or more of the GUIs shown in FIGS. 2A-2E may be presented concurrently. For example, in some implementations the GUI of FIG. 2D or FIG. 2E may be presented at the same time as the GUI of FIG. 2A, e.g., in a different area of the display after a right hand or left hand has been selected.

FIGS. 3A, 3B, 3C and 3D show additional examples of GUIs that may be presented during a multiple-digit enrollment according to some implementations. As with other disclosed implementations, the particular arrangements of features, types of features and numbers of features that are shown in FIGS. 3A-3D are merely provided by way of example. Moreover, as with other methods disclosed herein, the sequence of GUIs shown in FIGS. 3A-3D is merely an example. Other sequences of GUIs may include more or fewer GUIs than indicated in FIGS. 3A-3D.

Figure 3:
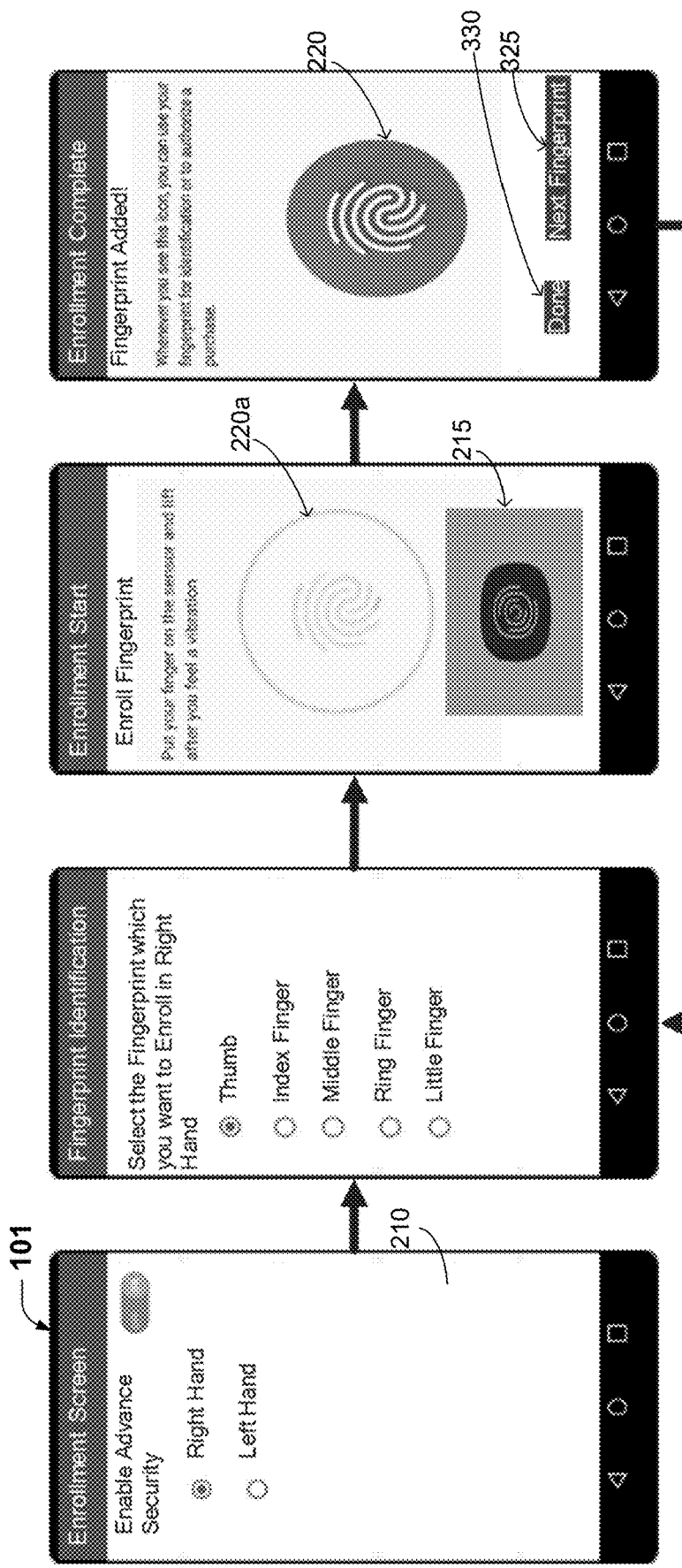
FIGS. 3A, 3B, 3C and 3D show additional examples of GUIs that may be presented during a multiple-digit enrollment according to some implementations.

In the example shown in FIG. 3A, the control system is controlling the display system 210 to present a GUI for enabling or disabling an enrollment process for enhanced security authentication. According to this example, the GUI of FIG. 3A is configured as described above with reference to FIG. 2A.

In this example, after the control system has received user input indicating that an enrollment process for enhanced security authentication should be enabled and indicating whether fingerprints will be obtained from a right hand or a left hand during an initial stage of the enrollment process, the control system is configured for controlling the display system 210 to present the GUI of FIG. 3B. In this example, because a user had previously selected to enroll digits of the user's right hand via the GUI of FIG. 3A, the user may interact with the GUI of FIG. 3B in order to specify the particular digit of the user's right hand from which finger image data was obtained.

In this implementation, the GUI of FIG. 3C includes a text prompt for the user to place a digit in a fingerprint sensor area 215 and to lift the digit after the user feels a vibration caused by a haptic feedback system. In this example, the fingerprint sensor area 215 corresponds to at least a portion of the fingerprint sensor system 102, which is not visible in FIGS. 3A-3D. According to this implementation, the control system is configured to control the haptic feedback system to provide haptic feedback after the control system has received adequate fingerprint sensor data from the fingerprint sensor system 102, e.g., as described above with reference to FIG. 2C.

According to this example, the control system is also configured for controlling the display system 210 to present the GUI of FIG. 3D after the control system has received adequate fingerprint sensor data from the fingerprint sensor system 102 via the GUI of FIG. 3C. In this example, the GUI of FIG. 3D includes an icon 220 and explanatory text indicating that when the icon 220 is presented, a user may use a fingerprint for identification and/or to authorize a purchase. In some implementations, the control system may be configured for controlling the display system 210 to darken, brighten and/or change the shape of the icon 220a that is shown in the GUI of FIG. 3C in order to subsequently present the icon 220 that is shown in the GUI of FIG. 3D.

In this example, the GUI of FIG. 3D also includes an active textual prompt 325 with which a user may interact (in this example, by touching the textual prompt 325) in order to enroll another fingerprint. In this example, if the control system determines that a user has touched the textual prompt 325, the control system is configured to control the display system 210 to present the GUI of FIG. 3B. In this example, the GUI of FIG. 3D also includes an active textual prompt 330 with which a user may interact (in this example, by touching the textual prompt 330) in order to indicate that the user wishes to end this stage of the enrollment process, e.g., in order to indicate that a fingerprint has been enrolled for all digits of the current hand. According to some implementations, after a user has enrolled all digits of one hand, the GUI of FIG. 3A may be presented again so that the user may select the other hand. In some alternative implementations, the user may automatically be prompted to enter a digit of the other hand without the need for the user to manually select the other hand.

In some alternative implementations, one or more of the GUIs shown in FIGS. 3A-3D may be presented concurrently. For example, in some implementations the GUI of FIG. 3B may be presented at the same time as the GUI of FIG. 3A, e.g., in a different area of the display system 210.

Moreover, in some alternative enrollment process implementations, fingerprint sensor data corresponding to more than one digit may be obtained concurrently. For example, in some enrollment process implementations, fingerprint sensor data corresponding to a thumb and an index finger, an index finger and a middle finger, a middle finger and a ring finger, a ring finger and a pinky finger, or other combinations of two digits, may be obtained concurrently. In some enrollment process implementations, fingerprint sensor data corresponding to one of the following combinations of three digits, or other combinations of three digits, may be obtained concurrently: (a) a thumb, an index finger and a middle finger; (b) an index finger, a middle finger and a ring finger; (c) a middle finger, a ring finger and a pinky finger; (d) a thumb, a middle finger and a ring finger; (e) a thumb, a middle finger and a pinky finger; (f) a thumb, an index finger and a ring finger; and/or (f) a thumb, an index finger and a pinky finger. Alternatively, or additionally, one or more combinations of 4 digits, or all five digits, may be obtained concurrently. In some such examples, multiple digit placement areas corresponding with a fingerprint sensor system area may be presented simultaneously during an enrollment process. In some such examples, the multiple digit placement areas will include a digit placement area corresponding to each of multiple digits for which fingerprint sensor data will be obtained concurrently.

FIG. 4 shows a table of fingerprint authentication cases according to one example. In this example, each of the fingerprint authentication cases corresponds to one or more fingerprints obtained during an enrollment process, which could be used during an authentication process. The information shown in FIG. 4 corresponds to information that may be obtained during an enrollment process such as that described above with reference to FIG. 2A et seq., or via one of the alternative implementations mentioned above. According to some examples, a data structure (e.g., a lookup table) that includes data for various fingerprint authentication cases, such as that shown in FIG. 4, may be stored in a memory along with (or including pointers to) fingerprint sensor data, fingerprint feature data, etc., corresponding to the digit(s) indicated in each of the fingerprint authentication cases.

In this example, the fingerprint authentication cases include what may be referred to herein as "multiple-fingerprint authentication cases," for which two or more fingerprints are obtained during an enrollment process and available for use during an authentication process. According to this example, fingerprint authentication cases 6-9 are multiple-fingerprint authentication cases. In some examples, the fingerprint sensor data corresponding to multiple-fingerprint authentication cases may be obtained individually, e.g., as described above with reference to FIG. 2A et seq. However, in some implementations the fingerprint sensor data corresponding to multiple-fingerprint authentication cases may be obtained concurrently from the indicated digits.

As with other disclosed implementations, the types, numbers and arrangements of elements in FIG. 4 are merely made by way of example. For example, FIG. 4 only shows fingerprint authentication cases for a user's right hand. In some examples, fingerprint authentication cases for both hands may be determined and stored, along with (or with pointers to) corresponding fingerprint sensor data. In some implementations, the fingerprint authentication cases may include only multiple-fingerprint authentication cases and no single-fingerprint authentication cases. In some implementations, the fingerprint authentication cases may include one or more multiple-fingerprint authentication cases corresponding to three or more digits. As noted above, the fingerprint sensor data for multiple-fingerprint authentication cases may be obtained for individual digits and/or concurrently for two or more digits, depending on the particular implementation.

Figure 5A:
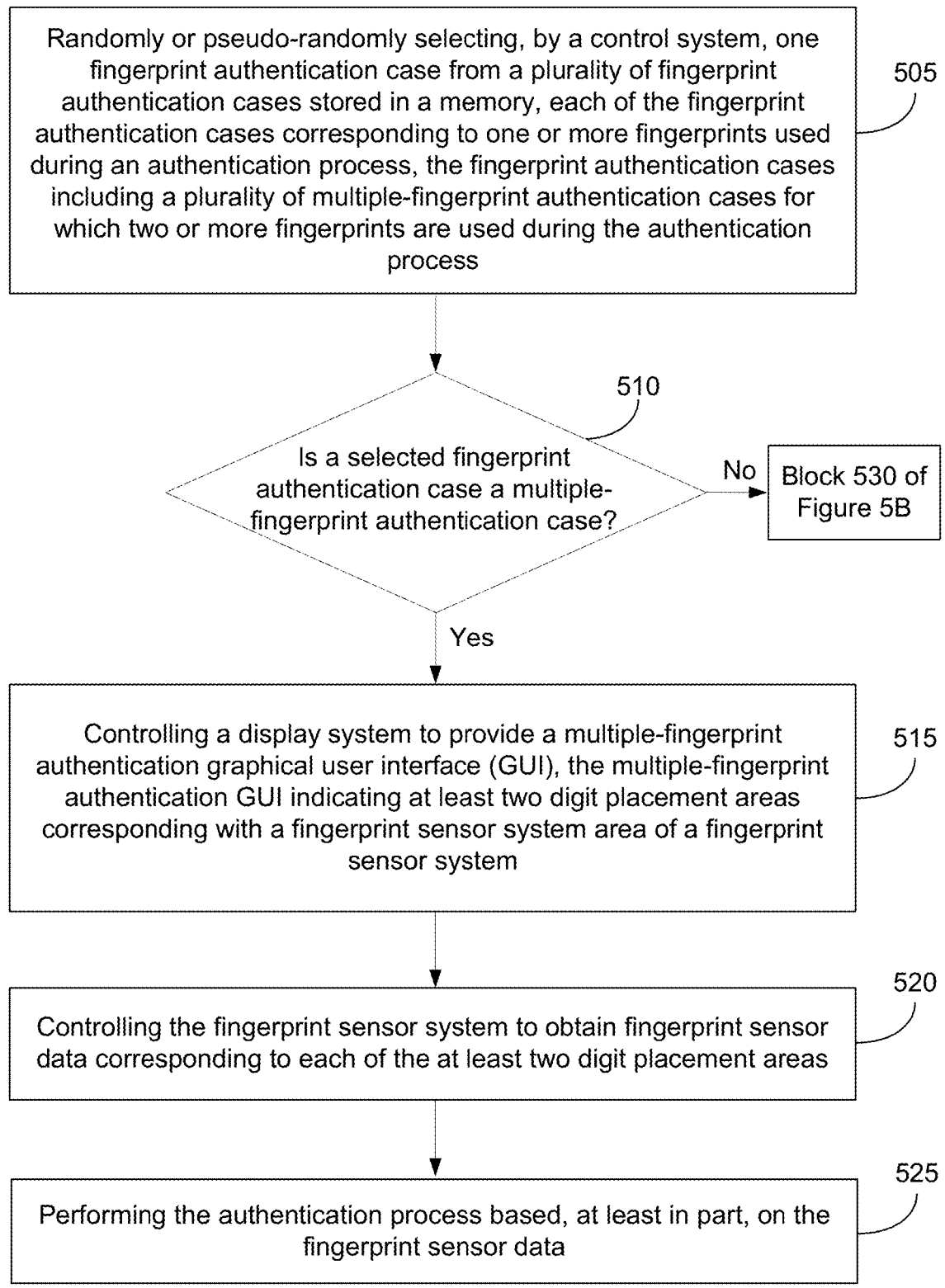
FIGS. 5A and 5B are flow diagrams that provide examples of operations according to some disclosed methods.
Figure 5B:
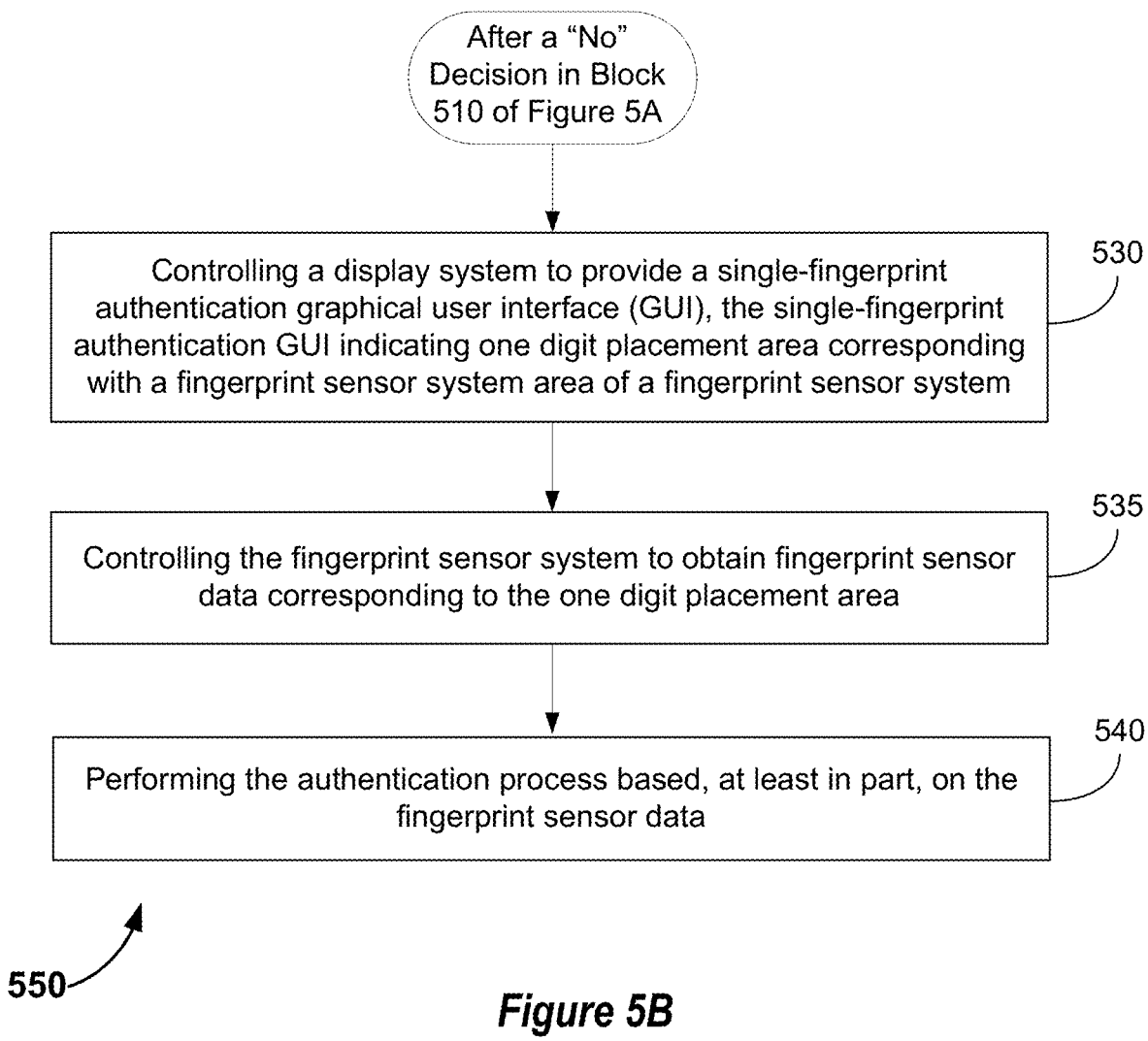

FIGS. 5A and 5B are flow diagrams that provide examples of operations according to some disclosed methods. The blocks of FIGS. 5A and 5B may, for example, be performed by the apparatus 101 of FIG. 1 or by a similar apparatus. As with other methods disclosed herein, the methods outlined in FIGS. 5A and 5B may include more or fewer blocks than indicated. Moreover, the blocks of methods disclosed herein are not necessarily performed in the order indicated. In some instances, one or more blocks may be performed concurrently.

Referring first to FIG. 5A, in this example block 505 involves randomly or pseudo-randomly selecting, by a control system, one fingerprint authentication case from a plurality of fingerprint authentication cases stored in a memory. For example, block 505 may involve the control system 106 of FIG. 1 randomly or pseudo-randomly selecting one fingerprint authentication case from a plurality of fingerprint authentication cases (such as those described above with reference to FIG. 4) in a data structure stored in the memory system 108. In some such implementations, the control system may be configured for implementing a random-number generator (RNG), e.g., by implementing an RNG algorithm via software that is stored on one or more non-transitory media. In some such examples, block 505 may involve making an "RNG call" to obtain a random number from the RNG. In some such examples, the control system may be configured for implementing a hardware random-number generator (HRNG), which generates random numbers as a function of the current value of some physical environment attribute that is constantly changing in a manner that is extremely difficult to model. In some examples, the control system may be configured for implementing a pseudo-random number generator (PRNG). A PRNG can generate numbers that appear to be random, but are actually deterministic. The entire seemingly random sequence of numbers output by a PRNG can be completely determined by a shorter initial value, known as a seed value or key.

According to some implementations, the process of randomly or pseudo-randomly selecting fingerprint authentication cases may be part of an enhanced security authentication process. In some such implementations, method 500 may involve controlling the display system to provide a GUI for enabling or disabling the enhanced security authentication process, e.g., prior to the implementation of block 505. The GUI for enabling or disabling the enhanced security authentication process may, for example, be presented as part of a "settings" menu for a device that is implementing the method 500, such as a mobile device. In some examples, the GUI for enabling or disabling the enhanced security authentication process may be similar to the advanced security control 205 that is shown in FIG. 2A.

According to this example, each of the fingerprint authentication cases corresponds to one or more fingerprints used during an authentication process. In this implementation, the fingerprint authentication cases include at least two (a plurality of) multiple-fingerprint authentication cases for which two or more fingerprints are used during the authentication process. According to some examples, the fingerprint authentication cases may include one or more single-fingerprint authentication cases. In some such implementations, the fingerprint authentication cases may include at least two two-fingerprint authentication cases. In some such implementations, the fingerprint authentication cases may include at least one two-fingerprint authentication case and at least one authentication case that corresponds to three or more fingerprints. In some such implementations, all of the fingerprint authentication cases may correspond to two or more fingerprints. In some alternative implementations, the fingerprint authentication cases may include only one multiple-fingerprint authentication case.

Figures 6A, 6B:
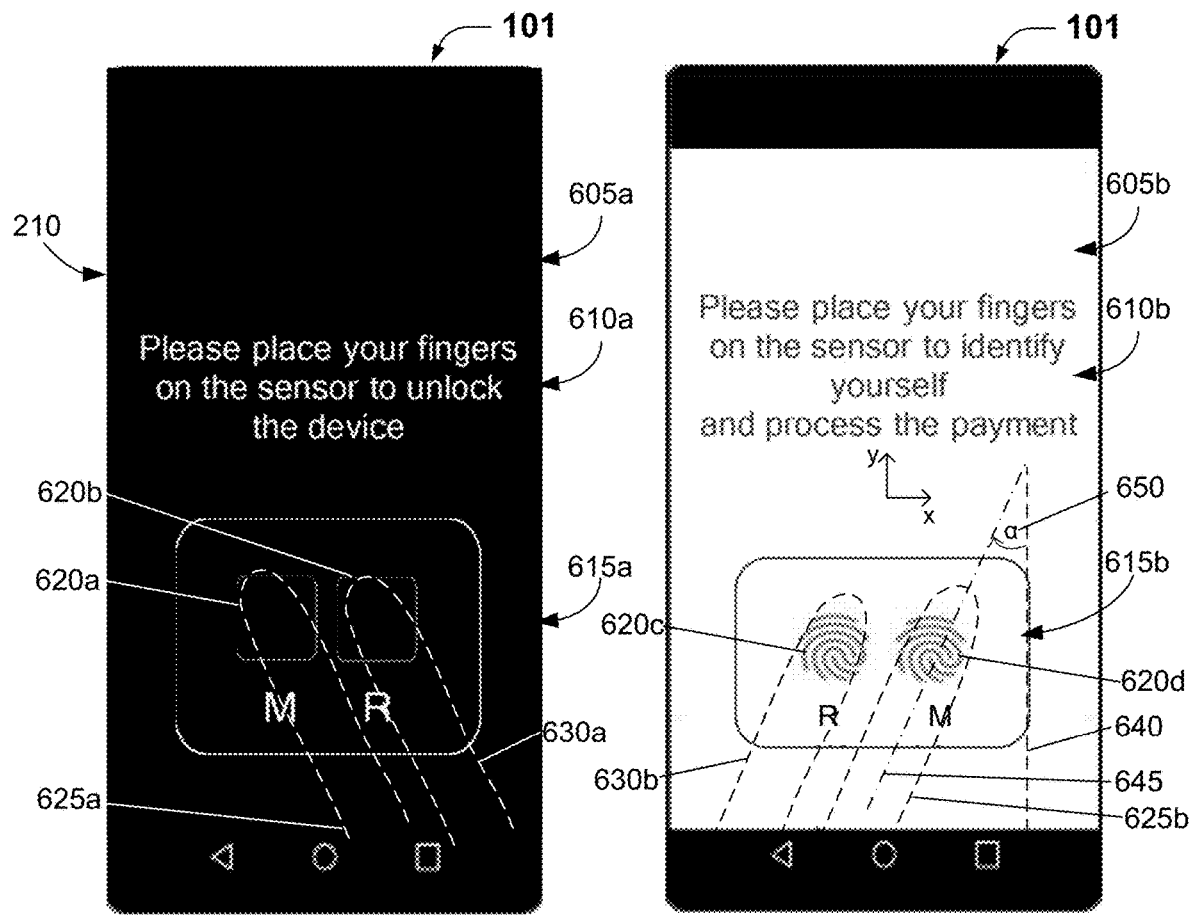
FIGS. 6A and 6B show examples of multiple-fingerprint authentication GUIs.

In this example, block 510 involves determining, by the control system, whether a selected fingerprint authentication case is a multiple-fingerprint authentication case. According to this implementation, upon determining that the selected fingerprint authentication case is a multiple-fingerprint authentication case, the control system is configured to implement block 515, which involves controlling the display system to provide a multiple-fingerprint authentication graphical user interface (GUI). In this example, the multiple-fingerprint authentication GUI indicates at least two digit placement areas corresponding with a fingerprint sensor system area. Some examples of digit placement areas are shown in FIG. 6A et seq.

In some examples, the fingerprint sensor system area may be, or may include, an ultrasonic fingerprint sensor area. According to some such examples, an apparatus that is implementing the method 500 (such as the apparatus 101 of FIG. 1) may include a cover glass proximate a first side of the display that is presenting the multiple-fingerprint authentication GUI. In some such examples, at least a portion of the ultrasonic fingerprint sensor area may be proximate a second side of the display. The second side may be an opposite side relative to the first side. For example, the ultrasonic fingerprint sensor area may reside below or inside the display. According to some implementations, the fingerprint sensor system area may be, or may include, an optical fingerprint sensor area.

According to some examples, the multiple-fingerprint authentication GUI may include digit information regarding which digit a user should place in each of the at least two digit placement areas. In some examples, the digit information may include a digit identification label on or adjacent to each of the at least two digit placement areas. According to some examples, the multiple-fingerprint authentication GUI may include implicit or explicit hand information indicating a hand corresponding to digits a user should place in the at least two digit placement areas. For example, the hand information may indicate a right hand or a left hand. In some examples, the hand information may include a realistic image of a right hand or a left hand (e.g., a hand image like that of FIG. 2D), a right hand or a left hand cartoon or icon, one or more letters (e.g., "R" or "L") and/or one or more symbols. Some examples of digit information and hand information are described below with reference to FIG. 6A et seq.

In some examples, method 500 involves performing a hand determination process. According to some such examples, the hand determination process may involve determining whether digits placed in the at least two digit placement areas correspond to a right hand or a left hand. In some such examples, the hand determination process may be based, at least in part, on the fingerprint sensor data corresponding to at least one digit placement area. For example, the control system may be configured to match a pattern of fingerprint features (such as fingerprint minutiae) extracted from currently-obtained fingerprint sensor data with a pattern of fingerprint features extracted from previously-obtained fingerprint sensor data, such as fingerprint sensor data that was previously obtained during an enrollment process. The control system may be configured to identify one or more particular enrolled digits, based on the feature-matching process, and to determine a hand corresponding to the one or more particular enrolled digits.

Alternatively, or additionally, the hand determination process may be based, at least in part, on inertial sensor data from an inertial sensor system. In some such examples, the hand determination process may involve a first device (such as a cellular telephone or other mobile device) receiving inertial sensor data from an inertial sensor system of a second device (e.g., a wearable device such as a watch, an armband, a ring, etc.). For example, if a person is wearing the second device on the person's left arm, left wrist or left finger, an inertial sensor system of a second device may be configured to determine a motion of the person's left hand if digits of the left hand are being moved towards, then positioned on, the at least two digit placement areas. The inertial sensor data corresponding to the movement of the person's left hand may indicate translation, rotation and/or acceleration of the left hand as the digits of the left hand are being moved towards, then positioned on, the at least two digit placement areas. The second device may be configured to provide the inertial sensor data corresponding to the movement of the person's left hand (and/or data corresponding to the inertial sensor data, such as a hand motion indication, a hand acceleration indication, a hand rotation indication, etc.) to the first device. According to some hand determination processes, the absence of inertial sensor data from the second device indicating translation, rotation and/ or acceleration of the hand on which the second device is being worn, along with a detection of digits in the at least two digit placement areas may be interpreted as an indication that the digits are digits of another hand (e.g., in the foregoing example, the right hand).

In the example shown in FIG. 5A, block 520 involves controlling the fingerprint sensor system to obtain fingerprint sensor data corresponding to each of the at least two digit placement areas. As noted elsewhere herein, the fingerprint sensor data may be ultrasonic fingerprint sensor data, optical fingerprint sensor data, and/or another type of fingerprint sensor data, depending on the particular implementation. In some instances, block 520 may involve obtaining the fingerprint sensor data from target objects (such as actual fingers or artificial fingers) that are simultaneously presented in the at least two digit placement areas. In some examples, the fingerprint sensor data may be obtained simultaneously from two or more target objects placed in the at least two digit placement areas.

According to this example, block 525 involves performing the authentication process based, at least in part, on the fingerprint sensor data. In some examples, block 525 (or another part of method 500) may involve extracting fingerprint features from the fingerprint sensor data. The fingerprint features may, for example, include fingerprint minutiae, keypoints and/or sweat pores. In some examples, the fingerprint features may include ridge ending information, ridge bifurcation information, short ridge information, ridge flow information, island information, spur information, delta information, core information, etc.

Block 525 may involve comparing fingerprint features that have currently been obtained from objects presented in the at least two digit placement areas with fingerprint features that have previously been obtained from digits during an enrollment process. According to this example, the previously-obtained fingerprint features have previously been obtained from two or more digits that correspond to the multiple-fingerprint authentication case. For example, if the selected multiple-fingerprint authentication case were case 6 of FIG. 4, the previously-obtained fingerprint features would have previously been obtained from a user's right thumb and right index finger.

In some implementations, the control system 106 may be configured to extract sub-epidermal features from the fingerprint sensor data. In some ultrasonic sensor implementations, the sub-epidermal features may include sub-epidermal layer information corresponding to reflections received within a time interval corresponding with a sub-epidermal region. According to some implementations, a subsequent authentication process may involve comparing previously-obtained sub-epidermal features (e.g., obtained during a user registration or enrollment process) with currently-obtained sub-epidermal features.

The sub-epidermal features may, for example, include dermis layer information. In some ultrasonic sensor implementations, the dermis layer information may have been obtained within a time interval corresponding with a dermis layer. The subsequent authentication process may be based, at least in part, on the dermis layer information. Alternatively, or additionally, the sub-epidermal features may include information regarding other sub-epidermal layers, such as the papillary layer, the reticular layer, the subcutis, etc., and any blood vessels, lymph vessels, sweat glands, hair follicles, hair papilla, fat lobules, etc., that may be present within such tissue layers.

In some examples, the control system 106 may be configured for controlling access to the apparatus 101, or to another device, based at least in part on the authentication process. For example, in some implementations a mobile device (such as a cell phone) may include the apparatus 101. In some such examples, the control system 106 may be configured for controlling access to the mobile device based, at least in part, on the subsequent authentication process.

In some implementations an Internet of things (IoT) device may include the apparatus 101. For example, in some such implementations a device intended for use in a home, such as a remote control device (such as a remote control device for a smart television), a stove, an oven, a refrigerator, a stove, a coffee maker, an alarm system, a door lock, a mail/parcel box lock, a thermostat, etc., may include the apparatus 101. In some such examples, the control system may be configured for controlling access to the IoT device based, at least in part, on the authentication process.

In alternative implementations, an automobile (including but not limited to a partially or fully autonomous automobile), a partially or fully autonomous delivery vehicle, a drone, or another device typically used outside of the home may include one or more instances of the apparatus 101. In some such examples, the control system may be configured for controlling access to the vehicle, the drone, etc., based at least in part on the subsequent authentication process.

In some examples, including but not limited to many IoT implementations, there may be a metal, plastic, ceramic or polymer layer between an outer surface of the apparatus 101, or an outer surface of a device that includes the apparatus 101. In such implementations, the acoustic waves transmitted towards, and reflected from, a finger or other target may need to pass through the metal, plastic, ceramic or polymer layer. Ultrasound and other acoustic waves can be successfully transmitted through e.g., a metal layer, whereas some other types of waves (e.g., light waves) cannot. Similarly, ultrasound and other acoustic waves can be successfully transmitted through an optically opaque plastic, ceramic or polymer layer, whereas some other types of waves, such as light waves, cannot. This feature is another potential advantage of some disclosed implementations, as compared to devices that rely upon optical or capacitive fingerprint sensors.

According to some examples, the apparatus may be configured to perform a liveness detection process or another type of spoof detection process. In some instances, spoofing may involve using a finger-like object that includes silicone rubber, polyvinyl acetate (white glue), gelatin, glycerin, etc., with a fingerprint pattern of a rightful user formed on an outside surface. In some cases, a hacker may form a fingerprint pattern of a rightful user on a sleeve or partial sleeve that can be slipped over or on the hacker's finger. In some implementations, the spoof detection process may be based, at least in part, on a sleeve detection process and/or on ultrasonic signals corresponding to sub-epidermal features. Some such liveness determinations may involve obtaining first sub-epidermal features from first ultrasonic image data at a first time and obtaining second sub-epidermal features from second ultrasonic image data at a second time. Some examples may involve making a liveness determination based on a change between the first sub-epidermal features and the second sub-epidermal features. This type of temporal change may, for example, correspond with the flow of blood within a finger.

According to some examples, the authentication process of block 525 may involve a determination of relative digit placement, digit rotation, digit angular orientation and/or digit scaling. In some such examples, relative digit placement, digit rotation and/or digit angular orientation may be measured during an enrollment process and saved in a memory, e.g., in the same memory in which corresponding fingerprint authentication cases are stored. As described below with reference to FIGS. 7A-10C, some examples of relative digit placement, digit rotation, digit angular orientation and/or digit scaling are possible for human fingers that are attached to a human hand, whereas other examples of relative digit placement, digit rotation, digit angular orientation and/or digit scaling are only possible for detached fingers, whether actual or artificial. According to some such examples, if the control system determines that the relative digit placement, digit rotation, digit angular orientation and/or digit scaling of the target objects in the at least two digit placement areas are impossible, the authentication process fails. Alternatively, or additionally, in some examples if the control system determines that the relative digit placement, digit rotation and/or digit angular orientation of the target objects in the at least two digit placement areas does/do not match the corresponding relative digit placement, digit rotation and/or digit angular orientation of digits measured during an enrollment process, the authentication process fails.

In some implementations of method 500, the same randomly or pseudo-randomly selected fingerprint authentication case may be used until after a successful authentication process involving the randomly or pseudo-randomly selected fingerprint authentication case. In some such implementations, if the authentication process fails, the same fingerprint authentication case will continue to be used for subsequent authentication processes until after a successful authentication process. According to some implementations of method 500, another fingerprint authentication case may be randomly or pseudo-randomly selected during a subsequent authentication process (in other words, after a successful authentication process).

Referring again to FIG. 5A, in some instances the control system may determine in block 510 that the selected fingerprint authentication case is not a multiple-fingerprint authentication case. In some such instances, the process may continue with block 530 of FIG. 5B. In this example, block 530 involves controlling (via the control system) a display system to provide a single-fingerprint authentication GUI. According to this example, the single-fingerprint authentication GUI indicates one digit placement area corresponding with a fingerprint sensor system area of the fingerprint sensor system. In this example, block 540 involves performing the authentication process based, at least in part, on the fingerprint sensor data obtained from the one digit placement area.

FIGS. 6A and 6B show examples of multiple-fingerprint authentication GUIs. In the example shown in FIG. 6A, the multiple-fingerprint authentication GUI 605a includes a textual prompt area 610a and a fingerprint sensor system area 615a. According to this example, the textual prompt area 610a includes a message prompting a user to place the user's fingers on the fingerprint sensor system area 615a in order to trigger an authentication process that could potentially result in unlocking the apparatus 101.

In this example, the fingerprint sensor system area 615a corresponds with at least a portion of the areal extent of a fingerprint sensor system 102 (not shown in FIG. 6A) of the apparatus 101. In some examples, the areal extent of the fingerprint sensor system 102 may correspond with the entire display 210, whereas in other examples the areal extent of the fingerprint sensor system 102 may correspond with only a portion of the display 210, e.g., one-half, one-quarter, etc. According to this example, the fingerprint sensor system area 615a includes digit placement area 620a and digit placement area 620b. According to this implementation, the digit placement areas 620a and 620b each have corresponding digit information regarding which digit a user should place in the corresponding digit placement area: the digit placement area 620a has a corresponding and adjacent digit identification label "M," corresponding to a middle finger and the digit placement area 620b has a corresponding and adjacent digit identification label "R," corresponding to a ring finger.

Because of the relative digit placement indicated by the digit placement areas 620a and 620b, the multiple-fingerprint authentication GUI 605a includes implicit "hand information." As noted above, the term "hand information" as used herein refers to information indicating a hand corresponding to one or more digits a user should place in one or more corresponding digit placement areas. In this example, because the digit placement area 620a is for placement of a middle finger 625a and the digit placement area 620b is for placement of a ring finger 630a, the relative digit placement indicated by the digit placement areas 620a and 620b indicates that middle finger 625a and the ring finger 630a correspond to a right hand.

In the example shown in FIG. 6B, the multiple-fingerprint authentication GUI 605b includes a textual prompt area 610b and a fingerprint sensor system area 615b. According to this example, the textual prompt area 610b includes a message prompting a user to place the user's fingers on the fingerprint sensor system area 615b in order to trigger an authentication process that could potentially result in processing a payment via the apparatus 101. The payment may, for example, be for a cash transfer made via a corresponding banking application or "app," for an online purchase, etc.

In this example, the fingerprint sensor system area 615b corresponds with at least a portion of the areal extent of a fingerprint sensor system 102 (not shown in FIG. 6B). According to this example, the fingerprint sensor system area 615b includes a digit placement area 620c and a digit placement area 620d. In this implementation, each of the digit placement areas 620c and 620d has corresponding digit information regarding which digit a user should place in the corresponding digit placement area: the digit placement area 620c has a corresponding and adjacent digit identification label "R," corresponding to a ring finger and the digit placement area 620d has a corresponding and adjacent digit identification label "M," corresponding to a middle finger.

Because of the relative digit placement indicated by the digit placement areas 620c and 620d, the multiple-fingerprint authentication GUI 605b includes implicit hand information. In this example, because the digit placement area 620c is for placement of a ring finger 630b and the digit placement area 620d is for placement of a middle finger 625b, the relative digit placement indicated by the digit placement areas 620c and 620d indicates that the ring finger 630b and the middle finger 625b correspond to a left hand.

Referring to both FIG. 6A and FIG. 6B, one may observe that the user needs to rotate the user's hand in order to place the proper fingers in the corresponding digit placement areas. In each case, a particular digit placement corresponds with a particular digit angular orientation. In the example shown in FIG. 6B, for example, the line 645 is intended to represent a central axis of the middle finger 625b. Here, the line 640 is parallel to a "y" axis of the apparatus 101. According to this example, the user needs to rotate the user's left hand by an angle 650 (shown as alpha (α) in FIG. 6B) relative to the "y" axis of the apparatus 101 in order to place the ring finger 630b and the middle finger 625b on the corresponding digit placement areas 620c and 620d. In some implementations, this digit angular orientation may be observed and stored during a multi-digit enrollment process. According to some such examples, an authentication process may be based, at least in part, on such a digit angular orientation.

FIGS. 6C, 6D, 6E, 6F, 6G and 6H show additional examples of GUIs for single-fingerprint and multiple-fingerprint enrollment and/or authentication. These examples may be used with or without a textual or audio prompt, depending on the particular implementation. The fingerprint authentication GUIs 605c-605h may be presented on a display 210 of the apparatus 101, though the display 210 and the apparatus 101 are not shown in FIGS. 6C-6H.

In the example shown in FIG. 6C, the fingerprint authentication GUI 605c includes a fingerprint sensor system area 615c and a hand icon 660c. In this example, the hand icon 660c corresponds to a user's right hand and indicates that the user should place the user's right index finger in the fingerprint sensor system area 615c. Accordingly, in this example the fingerprint authentication GUI 605c is a single-fingerprint GUI.

In the example shown in FIG. 6D, the fingerprint authentication GUI 605d includes a fingerprint sensor system area 615d and a hand icon 660d. In this example, the hand icon 660d corresponds to a user's right hand and indicates that the user should place the user's right index finger and right middle finger in the fingerprint sensor system area 615d. Accordingly, in this example the fingerprint authentication GUI 605d is a multiple-fingerprint GUI.

In the example shown in FIG. 6E, the fingerprint authentication GUI 605e includes a fingerprint sensor system area 615e and a hand icon 660e. In this example, the hand icon 660e corresponds to a user's right hand and indicates that the user should place the user's right index finger, right middle finger and right ring finger in the fingerprint sensor system area 615e. Accordingly, in this example the fingerprint authentication GUI 605e is a multiple-fingerprint GUI.

In the example shown in FIG. 6F, the fingerprint authentication GUI 605f includes a fingerprint sensor system area 615f and a hand icon 660f. In this example, the hand icon 660f corresponds to a user's left hand and indicates that the user should place the user's left index finger in the fingerprint sensor system area 615f. Accordingly, in this example the fingerprint authentication GUI 605c is a single-fingerprint GUI.

In the example shown in FIG. 6G, the fingerprint authentication GUI 605g includes a fingerprint sensor system area 615g and a hand icon 660g. In this example, the hand icon 660g corresponds to a user's left hand and indicates that the user should place the user's left index finger and left middle finger in the fingerprint sensor system area 615g. Accordingly, in this example the fingerprint authentication GUI 605g is a multiple-fingerprint GUI.

In the example shown in FIG. 6H, the fingerprint authentication GUI 605h includes a fingerprint sensor system area 615h and a hand icon 660h. In this example, the hand icon 660h corresponds to a user's left hand and indicates that the user should place the user's left index finger, left middle finger and left ring finger in the fingerprint sensor system area 615h. Accordingly, in this example the fingerprint authentication GUI 605h is a multiple-fingerprint GUI.

The fingerprint sensor system areas 615c-615h correspond with at least a portion of the areal extent of a fingerprint sensor system 102 of the apparatus 101 (not shown in FIGS. 6C-6H). In some examples, the areal extent of the fingerprint sensor system 102 may correspond with the entire display 210 (not shown in FIGS. 6C-6H), whereas in other examples the areal extent of the fingerprint sensor system 102 may correspond with only a portion of the display 210, e.g., one-half, one-quarter, etc.

Because the fingerprint authentication GUIs 605c-605h include visual prompts indicating the proper hand, the specific fingers, and an indication of the fingerprint sensor system area in which the specific fingers of the proper hand should be placed, a textual and/or audio prompt is optional. However, in some implementations the fingerprint authentication GUIs 605c-605h may include a textual prompt, e.g., text prompting a user to place the user's finger(s) on the fingerprint sensor system area for an enrollment process, in order to trigger an authentication process that could potentially result in unlocking the apparatus 101, etc.

Figure 7A:
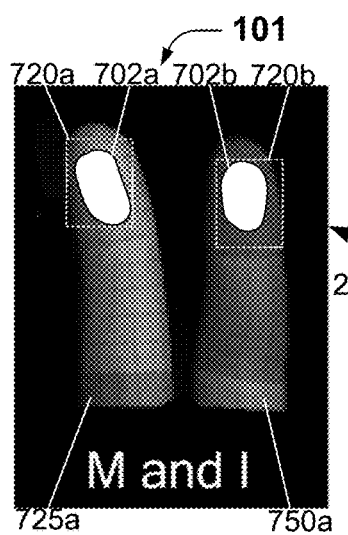
FIGS. 7A, 7B and 7C show examples of possible digit placement and digit rotation for digits that are currently attached to a human hand.
Figure 7B:
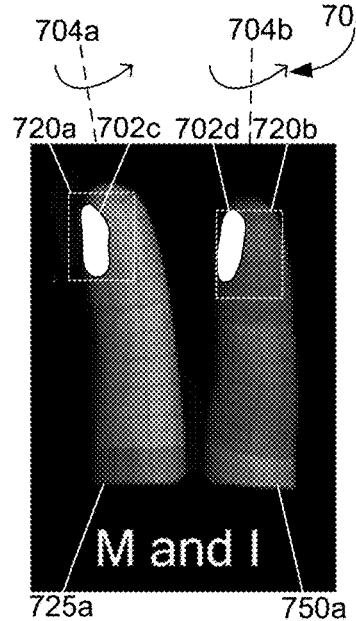
Figure 7C:
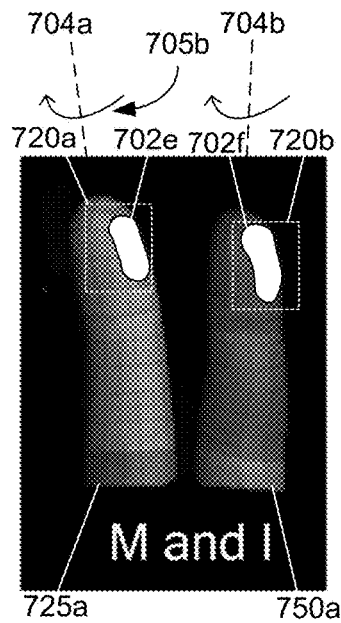

FIGS. 7A, 7B and 7C show examples of possible digit placement and digit rotation for digits that are currently attached to a human hand. In these examples, the perspective shown is that of an observer looking outwards (e.g., upwards) from the interior of the apparatus 101. For example, referring to FIG. 7A, the middle finger 725a and the index finger 750a are on the outside of a display 210 on which the digit placement areas 720a and 720b are being displayed. The contact areas 702a and 702b represent areas of the middle finger 725a and the index finger 750a, respectively, that are in contact with an outer surface of the apparatus 101, e.g., in contact with a cover glass on the exterior of the display 210. In this example, the contact areas 702a and 702b correspond to areas of the middle finger 725a and the index finger 750a, respectively, from which fingerprint sensor data was obtained during an authentication process.

According to some examples, the contact areas 702a and 702b may include, or may correspond to, areas of the middle finger 725a and the index finger 750a, respectively, from which fingerprint sensor data was obtained during an enrollment process (e.g., when the middle finger 725a and the index finger 750a were in the positions shown in FIG. 7A). According to some implementations, the spacing and arrangement of the digit placement areas during the enrollment process may have been similar to that shown in FIG. 7A. Fingerprint features corresponding to the contact areas 702a and 702b may have been subsequently extracted from this fingerprint sensor data and stored as part of the enrollment process. In some implementations, the enrollment process may involve making a correspondence between the fingerprint features obtained from the contact areas 702a and 702b and the spacing and arrangement of the digit placement areas during the enrollment process. This correspondence is one example of what may be referred to herein as "digit placement" information. Such digit placement information may, in some implementations, be used as part of a subsequent authentication process, e.g., to determine what fingerprint features should correspond with a particular spacing and arrangement of the digit placement areas used during the authentication process. In some such implementations, the authentication process may involve not only matching presently-obtained fingerprint features from the contact areas 702a and 702b with previously-obtained fingerprint features obtained from the middle finger 725a and the index finger 750a, but also an evaluation of the digit placement and/or the digit rotation of the middle finger 725a and the index finger 750a.

In the example of FIG. 7B, the contact areas 702c and 702d are relatively smaller than contact areas 702a and 702b. Moreover, the contact areas 702c and 702d correspond to different parts of the middle finger 725a and the index finger 750a. Similarly, in the example of FIG. 7C, the contact areas 702e and 702f are relatively smaller than contact areas 702a and 702b and correspond to different parts of the middle finger 725a and the index finger 750a. All of these differences are due to digit rotation of the middle finger 725a and the index finger 750a.

According to this example, central axes of the middle finger 725a and the index finger 750a are represented by dashed lines 704a and 704b, respectively, that are shown in FIGS. 7B and 7C. In the example shown in FIG. 7B, the middle finger 725a and the index finger 750a have been rotated in the direction of the arrows 705a relative to the positions of the middle finger 725a and the index finger 750a that are shown in FIG. 7A. In the example shown in FIG. 7C, the middle finger 725a and the index finger 750a have been rotated in the direction of the arrows 705b relative to the positions of the middle finger 725a and the index finger 750a that are shown in FIG. 7A.

In some implementations, the contact areas 702c and 702d may correspond to areas of the middle finger 725a and the index finger 750a, respectively, from which fingerprint sensor data was obtained during an enrollment process when the middle finger 725a and the index finger 750a were in the positions shown in FIG. 7B. According to some implementations, the spacing and arrangement of the digit placement areas during the enrollment process may have been similar to those shown in FIG. 7B. In some examples, a user may have been prompted to rotate the user's middle finger 725a and the index finger 750a to the position shown in FIG. 7B during the enrollment process. Fingerprint features corresponding to the contact areas 702c and 702d may have been subsequently extracted from fingerprint sensor data obtained during the enrollment process and stored as part of the enrollment process. In some examples, fingerprint features corresponding to the contact areas 702c and 702d may have been associated with a particular rotation of the middle finger 725a and the index finger 750a and stored as what may be referred to herein as "digit rotation" information during the enrollment process. The digit rotation information may, in some examples, be associated with digit placement information (e.g., with the spacing and arrangement of the digit placement areas during the enrollment process). Such digit rotation and placement information may, in some implementations, be used as part of a subsequent authentication process, e.g., to determine what fingerprint features should correspond with a particular spacing and arrangement of the digit placement areas used during the authentication process, as well as with particular digit rotations of the middle finger 725a and the index finger 750a. In some such implementations, the authentication process may involve not only matching presently-obtained fingerprint features from the contact areas 702c and 702d with previously-obtained fingerprint features obtained from the middle finger 725a and the index finger 750a, but also an evaluation of the digit placement and/or the digit rotation of the middle finger 725a and the index finger 750a.

Similarly, referring to FIG. 7C, in some examples the contact areas 702e and 702f may correspond to areas of the middle finger 725a and the index finger 750a, respectively, from which fingerprint sensor data was obtained during an enrollment process when the middle finger 725a and the index finger 750a were in the positions shown. In some examples, fingerprint features corresponding to the contact areas 702e and 702f may have been associated with a particular rotation of the middle finger 725a and the index finger 750a and stored as digit rotation information during the enrollment process. The digit rotation information may, in some examples, be associated with digit placement information (e.g., with the spacing and arrangement of the digit placement areas during the enrollment process). Such digit rotation and placement information may, in some implementations, be used as part of a subsequent authentication process. In some such implementations, the authentication process may involve not only matching presently-obtained fingerprint features from the contact areas 702e and 702f with previously-obtained fingerprint features obtained from the middle finger 725a and the index finger 750a, but also an evaluation of the digit placement and/or the digit rotation of the middle finger 725a and the index finger 750a.

Figure 7D:
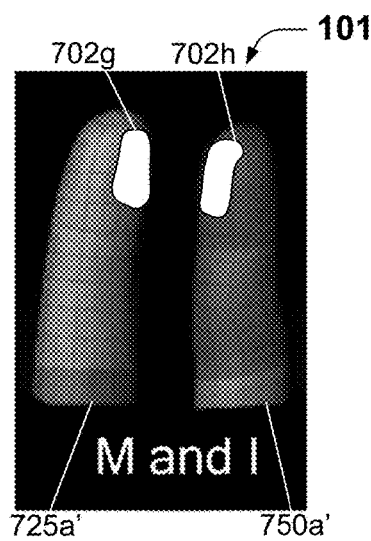
FIGS. 7D and 7E show examples of digit placement and digit rotation that are not possible for digits that are currently attached to a human hand.
Figure 7E:
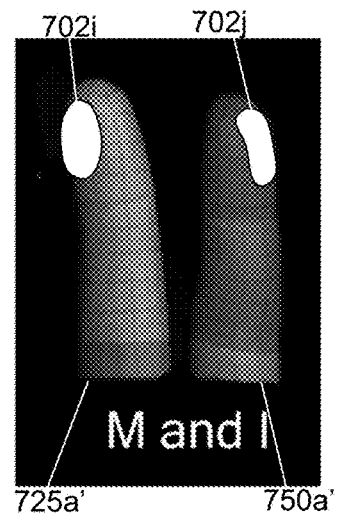

FIGS. 7D and 7E show examples of digit placement and digit rotation that are not possible for digits that are currently attached to a human hand. In the example shown in FIG. 7D, the contact area 702g for the middle finger 725a' (which is an artificial finger made to "spoof" the actual middle finger 725a in this example) roughly corresponds with the contact area 702e for the middle finger 725a that is shown in FIG. 7C. A control system of the apparatus 101 may, for example, be able to make the correspondence between the contact area 702g and the contact area 702e according to fingerprint features extracted from fingerprint sensor data obtained from the middle finger 725a during an authentication process. Accordingly, in some implementations the control system may be configured to determine (e.g., based on digit rotation and/or placement information obtained during an enrollment process) that the contact area 702g corresponds with the middle finger 725a being rotated as shown in FIG. 7C.

In the example shown in FIG. 7D, the contact area 702h for the index finger 750a' (which is an artificial finger made to "spoof" the actual index finger 750a in this example) roughly corresponds with the contact area 702d for the actual index finger 750a that is shown in FIG. 7B. A control system of the apparatus 101 may, for example, be able to make the correspondence between the contact area 702h and the contact area 702d according to fingerprint features extracted from fingerprint sensor data obtained from the actual index finger 750 during an authentication process. Accordingly, in some implementations the control system may be configured to determine that the contact area 702h corresponds with the index finger 750a being rotated as shown in FIG. 7B. In some implementations, a control system of the apparatus 101 may be configured to determine the relative rotations of the middle finger 725a and the index finger 750a that would correspond to the combination of index finger and middle finger rotations shown in FIG. 7D, e.g., based on digit rotation information obtained during an enrollment process. According to some implementations, the control system may be configured to determine that combination of index finger and middle finger rotations that is shown in FIG. 7D is not possible for the digits that are currently attached to a human hand.

In the example shown in FIG. 7E, the contact area 702i for the middle finger 725a' roughly corresponds with the contact area 702c for the middle finger 725a that is shown in FIG. 7B. A control system of the apparatus 101 may, for example, be able to make the correspondence between the contact area 702i and the contact area 702c according to fingerprint features extracted from fingerprint sensor data obtained from the middle finger 725a during an authentication process. Accordingly, in some implementations the control system may be configured to determine (e.g., based on digit rotation and/or placement information obtained during an enrollment process) that the contact area 702i corresponds with the middle finger 725a being rotated as shown in FIG. 7B.

In the example shown in FIG. 7E, the contact area 702j for the index finger 750a' roughly corresponds with the contact area 702b for the actual index finger 750a that is shown in FIG. 7C. A control system of the apparatus 101 may, for example, be able to make the correspondence between the contact area 702j and the contact area 702b according to fingerprint features extracted from fingerprint sensor data obtained from the actual index finger 750 during an authentication process. Accordingly, in some implementations the control system may be configured to determine that the contact area 702j corresponds with the index finger 750a being rotated as shown in FIG. 7C. In some implementations, a control system of the apparatus 101 may be configured to determine the relative rotations of the middle finger 725a and the index finger 750a that would correspond to the combination of index finger and middle finger rotations shown in FIG. 7E. According to some implementations, the control system may be configured to determine that combination of index finger and middle finger rotations that is shown in FIG. 7E is not possible for the digits that are currently attached to a human hand.

Figure 8A:
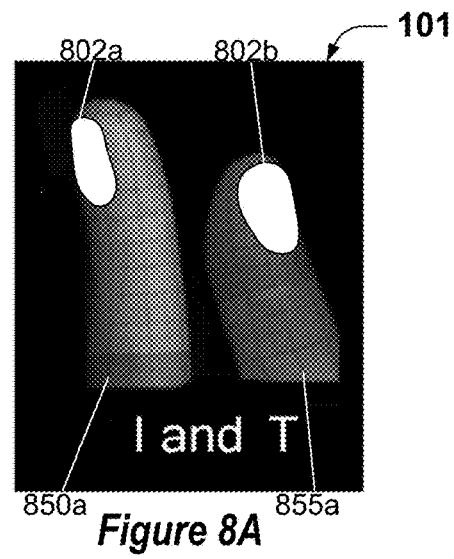
FIG. 8A shows an example of possible digit placement and digit rotation for digits that are currently attached to a human hand.
Figures 8B, 8C, 8D:
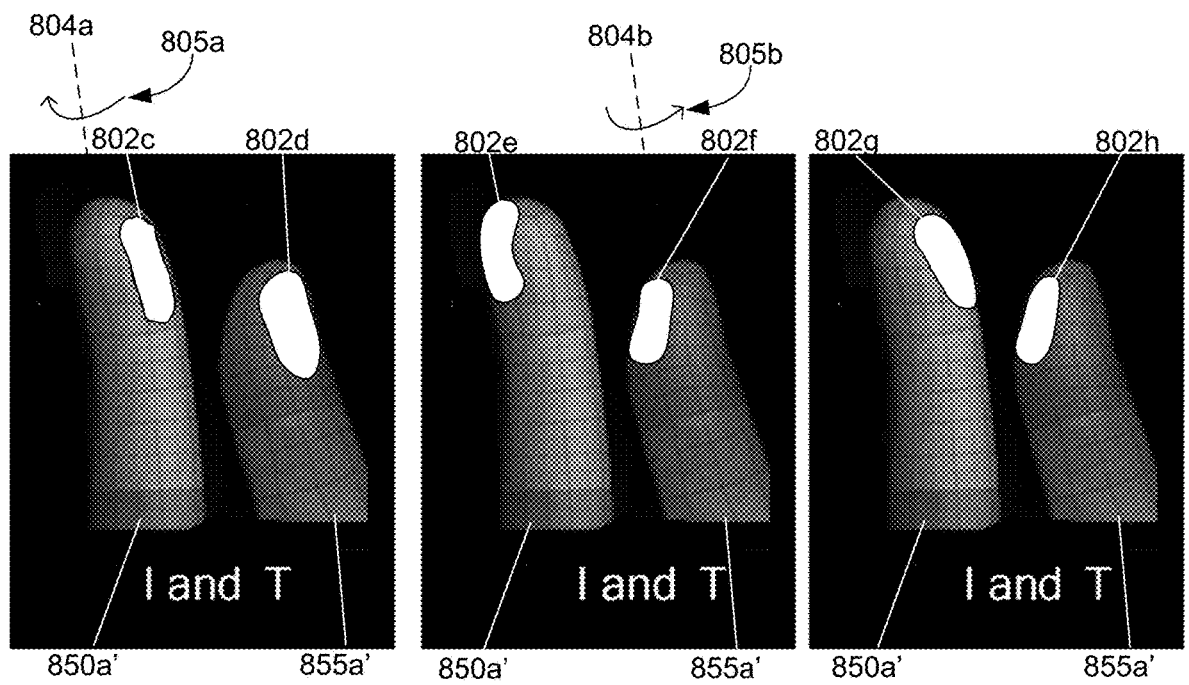
FIGS. 8B, 8C and 8D show examples of digit placement and digit rotation that are not possible for digits that are currently attached to a human hand.

FIG. 8A shows an example of possible digit placement and digit rotation for digits that are currently attached to a human hand. FIGS. 8B, 8C and 8D show examples of digit placement and digit rotation that are not possible for digits that are currently attached to a human hand. In these examples, as with FIGS. 7A-7E, the perspective shown is that of an observer looking outwards (e.g., upwards) from the interior of the apparatus 101.

According to some examples, the contact areas 802a and 802b may correspond to areas of the index finger 850a and the thumb 855a, respectively, from which fingerprint sensor data was obtained during an enrollment process when the index finger 850a and the thumb 855a were in the positions shown in FIG. 8A. Fingerprint features corresponding to the contact areas 802a and 802b may have been subsequently extracted from this fingerprint sensor data and stored as part of the enrollment process. In some implementations, the enrollment process may involve making a correspondence between the fingerprint features obtained from the contact areas 802a and 802b and the spacing and arrangement of the digit placement areas during the enrollment process. In some examples, fingerprint features corresponding to the contact areas 802a and 802b may have been associated with a particular rotation of the index finger 850a and the thumb 855a and stored as digit rotation information during the enrollment process. Such digit rotation and placement information may, in some implementations, be used as part of a subsequent authentication process, e.g., to determine what fingerprint features should correspond with a particular spacing and arrangement of the digit placement areas used during the authentication process, as well as with particular digit rotations of the index finger 850a and the thumb 855a.

FIGS. 8B, 8C and 8D show examples of digit placement and digit rotation that are not possible for digits that are currently attached to a human hand. In the example of FIG. 8B, the contact area 802d for the thumb 855a' (which is an artificial finger made to "spoof" the actual thumb 855a in this example) roughly corresponds with the contact area 802b for the thumb 855a that is shown in FIG. 8A. A control system of the apparatus 101 may, for example, be able to make the correspondence between the contact area 802d and the contact area 802b according to fingerprint features extracted from fingerprint sensor data obtained from the thumb 855a during an authentication process. Accordingly, in some implementations the control system may be configured to determine (e.g., based on digit rotation and/or placement information obtained during an enrollment process) that the contact area 802d corresponds with the thumb 855a being oriented/rotated as shown in FIG. 8A.

However, the contact area 802c for the index finger 850a' (which is an artificial finger made to "spoof" the actual index finger 850a in this example) does not correspond with the contact area 802a for the actual index finger 850a that is shown in FIG. 8A. A control system of the apparatus 101 may, for example, be able to make the correspondence between the fingerprint features extracted from fingerprint sensor data obtained from contact area 802c and fingerprint features extracted from fingerprint sensor data obtained from another part of the actual index finger 850 during an authentication process (e.g., when the actual index finger 850 was rotated around axis 804a in the direction of arrow 805a). Accordingly, in some implementations the control system may be configured to determine that the contact area 802c corresponds with the actual index finger 850a being rotated as the artificial index finger 850a' is shown to be rotated in FIG. 8B. In some implementations, a control system of the apparatus 101 may be configured to determine the relative rotations of the index finger 850a and the thumb 855a that would correspond to the combination of index finger and thumb rotations shown in FIG. 8B, e.g., based on digit rotation information obtained during the enrollment process. According to some implementations, the control system may be configured to determine that combination of index finger and thumb rotations that is shown in FIG. 8B is not possible for the digits that are currently attached to a human hand.

In the example of FIG. 8C, the contact area 802e for the index finger 850a' roughly corresponds with the contact area 802a that is shown in FIG. 8A. A control system of the apparatus 101 may, for example, be able to make the correspondence between the contact area 802e and the contact area 802a according to fingerprint features extracted from fingerprint sensor data obtained from the actual index finger 850a during an authentication process. Accordingly, in some implementations the control system may be configured to determine (e.g., based on digit rotation and/or placement information obtained during an enrollment process) that the contact area 802e corresponds with the index finger 850a being oriented/rotated as shown in FIG. 8A.

However, the contact area 802f for the thumb 855a' does not correspond with the contact area 802b for the actual thumb 855a that is shown in FIG. 8A. A control system of the apparatus 101 may, for example, be able to make the correspondence between the fingerprint features extracted from fingerprint sensor data obtained from contact area 802f and fingerprint features extracted from fingerprint sensor data obtained from another part of the actual thumb 855a during an authentication process (e.g., when the thumb 855a was rotated around axis 804b in the direction of arrow 805b). In some implementations, a control system of the apparatus 101 may be configured to determine the relative rotations of the index finger 850a and the thumb 855a that would correspond to the combination of index finger and thumb rotations shown in FIG. 8C, e.g., based on digit rotation information obtained during the enrollment process. According to some implementations, the control system may be configured to determine that combination of index finger and thumb rotations that is shown in FIG. 8C is not possible for the digits that are currently attached to a human hand.

In the example of FIG. 8D, the contact area 802g for the index finger 850a' roughly corresponds with the contact area 802c that is shown in FIG. 8B. According to some implementations, a control system of the apparatus 101 may be configured to determine (e.g., based on digit rotation and/or placement information obtained during an enrollment process) that the contact area 802g corresponds with the index finger 850a being oriented/rotated as shown in FIG. 8B. Moreover, the contact area 802h for the thumb 855a' corresponds with the contact area 802f that is shown in FIG. 8C. In some implementations, a control system of the apparatus 101 may be configured to determine the relative rotation of the thumb 855a that would correspond to the thumb rotation shown in FIG. 8C, e.g., based on digit rotation information obtained during the enrollment process. According to some implementations, the control system may be configured to determine that combination of index finger and thumb rotations that is shown in FIG. 8D is not possible for the digits that are currently attached to a human hand.

Figure 9A:
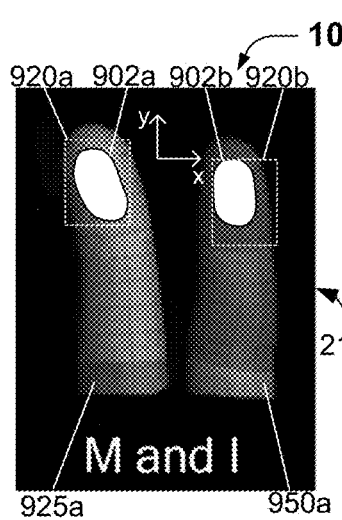
FIGS. 9A, 9B and 9C show examples of possible digit placements and digit angular orientations for digits that are currently attached to a human hand.
Figure 9B:
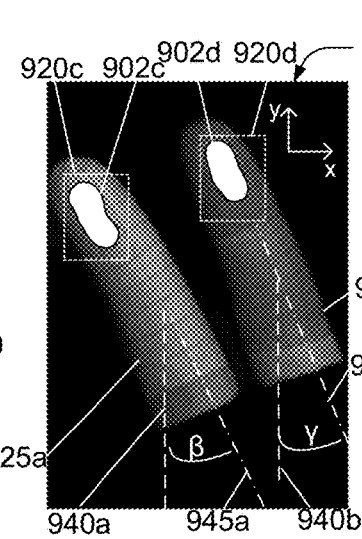
Figure 9C:
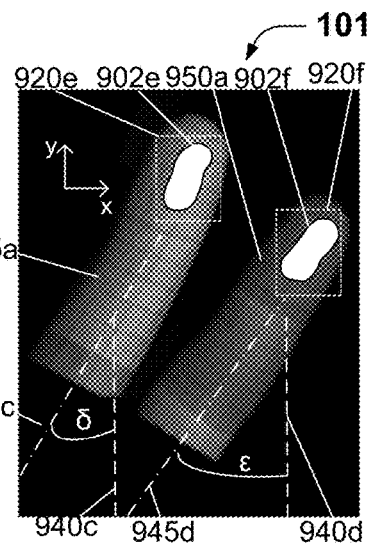

FIGS. 9A, 9B and 9C show examples of possible digit placements and digit angular orientations for digits that are currently attached to a human hand. In these examples, as with FIGS. 9D and 9E, the perspective shown is that of an observer looking outwards (e.g., upwards) from the interior of the apparatus 101. For example, referring to FIG. 9A, the middle finger 925a and the index finger 950a are on the outside of a display 210 on which the digit placement areas 920a and 920b are being displayed. The contact areas 902a and 902b represent areas of the middle finger 925a and the index finger 950a, respectively, that are in contact with an outer surface of the apparatus 101, e.g., in contact with a cover glass on the exterior of the display 210.

According to some examples, the contact areas 902a and 902b may correspond to areas of the middle finger 925a and the index finger 950a, respectively, from which fingerprint sensor data was obtained during an enrollment process when the middle finger 925a and the index finger 950a were in the positions shown in FIG. 9A. Fingerprint features corresponding to the contact areas 902a and 902b may have been subsequently extracted from this fingerprint sensor data and stored as part of the enrollment process. In some implementations, the enrollment process may involve making a correspondence between the fingerprint features obtained from the contact areas 902a and 902b and the spacing and arrangement of the digit placement areas during the enrollment process.

In some examples, fingerprint features corresponding to the contact areas 902a and 902b may have been associated with particular digit angular orientations of the middle finger 925a and the index finger 950a, relative to a coordinate system of the device used during the enrollment process, and stored as digit angular orientation information during the enrollment process. Such digit angular orientation and placement information may, in some implementations, be used as part of a subsequent authentication process, e.g., to determine what fingerprint features should correspond with a particular spacing and arrangement of the digit placement areas used during the authentication process, as well as with particular digit angular orientations of the middle finger 925a and the index finger 950a used during the authentication process.

For example, referring to FIG. 9B, the dashed lines 940a and 940b are parallel to the y axis of a coordinate system of the apparatus 101. In some examples, the digit placement areas 920c and 920d may have been selected and displayed in order to cause the middle finger 925a and the index finger 950a to be oriented as shown in FIG. 9B. According to some such examples, a control system of the apparatus 101 may be configured to determine, e.g., from the relative orientations and locations of fingerprint features obtained from the contact area 902c, that an axis 945a of the middle finger 925a is at an angle beta ($\beta$) relative to the y axis. In some such examples, the control system may be configured to determine, e.g., from the relative orientations and locations of fingerprint features obtained from the contact area 902d, that an axis 945b of the index finger 950a is at an angle gamma ($\gamma$) relative to the y axis. According to some such implementations, the control system may be configured to determine, e.g., based at least in part on a difference between beta ($\beta$) and gamma ($\gamma$), that the digit angular orientations of the middle finger 925a and the index finger 950a are consistent with those observed and stored during an enrollment process.

Similarly, referring to FIG. 9C, the dashed lines 940c and 940d are parallel to the y axis of a coordinate system of the apparatus 101. In some examples, the digit placement areas 920e and 920f may have been selected and displayed in order to cause the middle finger 925a and the index finger 950a to be oriented as shown in FIG. 9C. According to some such examples, a control system of the apparatus 101 may be configured to determine, e.g., from the relative orientations and locations of fingerprint features obtained from the contact area 902e, that an axis 945c of the middle finger 925a is at an angle delta ($\delta$) (or minus delta ($\delta$)) relative to the y axis. In some such examples, the control system may be configured to determine, e.g., from the relative orientations and locations of fingerprint features obtained from the contact area 902f, that an axis 945d of the index finger 950a is at an angle epsilon ($\varepsilon$) (or minus epsilon ($\varepsilon$)) relative to the y axis. According to some such implementations, the control system may be configured to determine, e.g., based at least in part on a difference between delta ($\delta$) and epsilon ($\varepsilon$), that the digit angular orientations of the middle finger 925a and the index finger 950a are consistent with those observed and stored during an enrollment process.

Figure 9D:
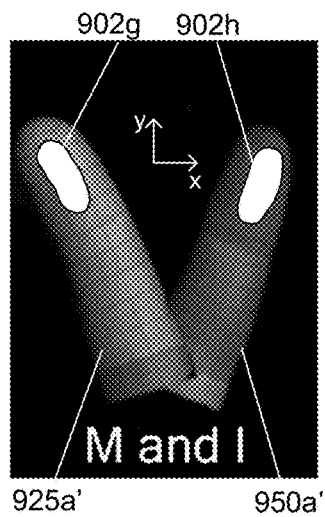
FIGS. 9D and 9E show examples of digit placement and digit angular orientation that are not possible for digits that are currently attached to a human hand.
Figure 9E:
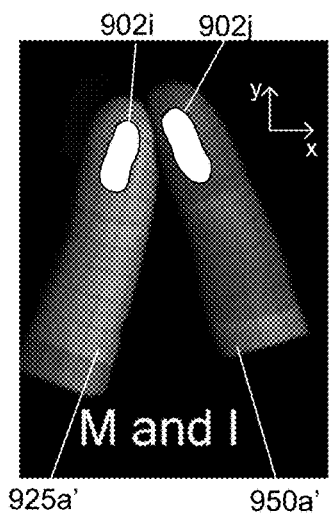

FIGS. 9D and 9E show examples of digit placement and digit angular orientation that are not possible for digits that are currently attached to a human hand. In the example of FIG. 9D, the contact area 902g for the middle finger 925a' (which is an artificial finger made to "spoof" the actual middle finger 925a in this example) roughly corresponds with the contact area 902c for the middle finger 925a that is shown in FIG. 9B. A control system of the apparatus 101 may, for example, be able to make the correspondence between the contact area 902g and the contact area 902c according to fingerprint features extracted from fingerprint sensor data obtained from the middle finger 925a during an authentication process. Alternatively, or additionally, the control system may be configured to determine the digit angular orientation of the middle finger 925a relative to a coordinate system of the apparatus 101, e.g., as described above with reference to FIG. 9B. Accordingly, in some implementations the control system may be configured to determine that the contact area 902g corresponds with the middle finger 925a having the digit angular orientation shown in FIG. 9B.

However, in some implementations the control system also may be configured to determine that the contact area 902h for the index finger 950a' (which is an artificial finger made to "spoof" the actual index finger 950a in this example) does not correspond with the contact area 902d for the actual index finger 950a that is shown in FIG. 9B, but instead corresponds with the contact area 902f for the actual index finger 950a that is shown in FIG. 9C. In some implementations the control system may be configured to determine that the correspondence between the contact areas 902f and 902h indicates that the actual index finger 950a would have the digit angular orientation shown in FIG. 9C. Alternatively, or additionally, the control system may be configured to determine the digit angular orientation of the index finger 950a relative to a coordinate system of the apparatus 101, e.g., as described above with reference to FIG. 9C. In some implementations, a control system of the apparatus 101 may be configured to determine that the combination of angular orientations of the middle finger 925a and the index finger 950a that is shown in FIG. 9D is not possible for digits that are currently attached to a human hand.

In the example of FIG. 9E, in some implementations the control system may be configured to determine that the contact area 902i for the middle finger 925a' roughly corresponds with the contact area 902e for the middle finger 925a that is shown in FIG. 9C, e.g., according to fingerprint features extracted from fingerprint sensor data obtained from the middle finger 925a during an authentication process. Alternatively, or additionally, the control system may be configured to determine the digit angular orientation of the middle finger 925a relative to a coordinate system of the apparatus 101, e.g., as described above with reference to FIG. 9C. Accordingly, in some implementations the control system may be configured to determine that the contact area 902i corresponds with the middle finger 925a having the digit angular orientation shown in FIG. 9C.

However, in some implementations the control system may be configured to determine that the contact area 902j for the index finger 950a' does not correspond with the contact area 902f for the actual index finger 950a that is shown in FIG. 9C. In some such implementations, the control system may be configured to determine that the contact area 902j corresponds with the contact area 902d for the actual index finger 950a that is shown in FIG. 9B. In some implementations the control system may be configured to determine that the correspondence between the contact areas 902d and 902j indicates that the actual index finger 950a would have the digit angular orientation shown in FIG. 9B. Alternatively, or additionally, the control system may be configured to determine the digit angular orientation of the index finger 950a relative to a coordinate system of the apparatus 101, e.g., as described above with reference to FIG. 9B. In some implementations, a control system of the apparatus 101 may be configured to determine that the combination of angular orientations of the middle finger 925a and the index finger 950a that is shown in FIG. 9E is not possible for digits that are currently attached to a human hand.

Figure 10A:
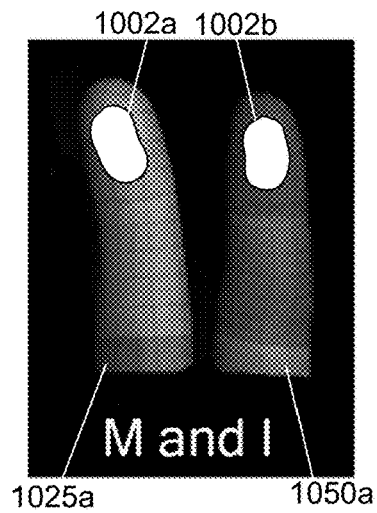
FIG. 10A shows an example of digit scaling that a control system has determined to be possible.

In addition to a determination of one or more of relative digit placement, digit rotation and/or digit angular orientation, in some examples a control system may be configured to implement an enrollment process and/or an authentication process that is based, at least in part, on a determination of digit scaling. FIG. 10A shows an example of digit scaling that a control system has determined to be possible. According to this example, the control system is configured to determine whether fingerprint features obtained from the contact area 1002a of the middle finger 1025a and from the contact area 1002b of the index finger 1050a match fingerprint features that were obtained from the same fingers and stored during an enrollment process. However, in this example the control system is also configured to evaluate the relative scaling of fingerprint features obtained from the contact areas 1002a and 1002b during the authentication process. For example, the control system may be configured to determine the arrangement and the spatial separation of a sample of fingerprint features (e.g., 3 fingerprint features, 5 fingerprint features, 7 fingerprint features, 10 fingerprint features, etc.) extracted from fingerprint sensor data obtained from the contact areas 1002a and 1002b, and to determine whether the arrangement and the spatial separation of the sample of fingerprint features is consistent with the arrangement and the spatial separation of the same fingerprint features, as determined during an enrollment process. In this example, the control system has determined that the relative scaling of fingerprint features obtained from the contact areas 1002a and 1002b is consistent with the relative scaling of the same fingerprint features that were determined during the enrollment process.

In some examples, the control system may be configured to evaluate the relative digit placement, digit rotation and/or digit angular orientation of the middle finger 1025a and the index finger 1050a and to determine whether the relative digit placement, digit rotation and/or digit angular orientation of the middle finger 1025a and the index finger 1050a are consistent with the relative digit placement, digit rotation and/or digit angular orientation of the middle finger 1025a and the index finger 1050a that were determined during an enrollment process.

Figure 10B:
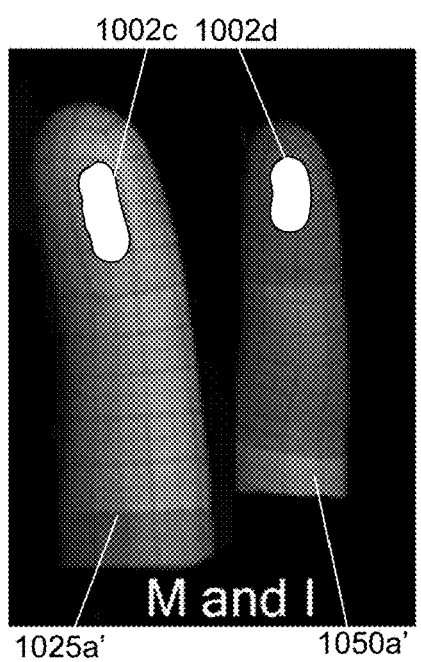
FIGS. 10B and 10C show an examples of digit scaling that a control system has determined not to be possible.
Figure 10C:
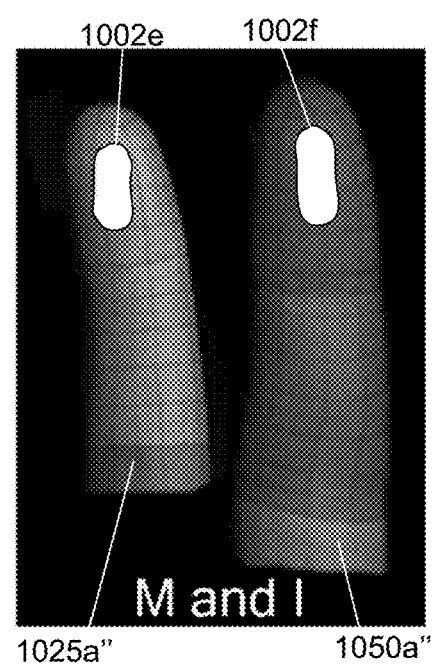

FIGS. 10B and 10C show an examples of digit scaling that a control system has determined not to be possible. In the example of FIG. 10B, the control system has determined that fingerprint features obtained from the contact area 1002c of the middle finger 1025a' and from the contact area 1002d of the index finger 1050a' match fingerprint features that were obtained from the middle finger 1025a and the index finger 1050a during an enrollment process. However, in this instance the control system has determined that the relative scaling of fingerprint features obtained from the contact areas 1002c and 1002d is not consistent with the relative scaling of the same fingerprint features that were determined during the enrollment process. In this example, the fingerprint features obtained from the contact area 1002c have a greater separation/larger scaling than the fingerprint features obtained from the contact area 1002d.

In the example of FIG. 10C, the control system has determined that fingerprint features obtained from the contact area 1002e of the middle finger 1025a" and from the contact area 1002f of the index finger 1050a" match fingerprint features that were obtained from the middle finger 1025a and the index finger 1050a during an enrollment process. However, the control system has determined that the relative scaling of fingerprint features obtained from the contact areas 1002e and 1002f is not consistent with the relative scaling of the same fingerprint features that were determined during the enrollment process. In this example, the fingerprint features obtained from the contact area 1002f have a greater separation/larger scaling than the fingerprint features obtained from the contact area 1002e.

Figure 11:
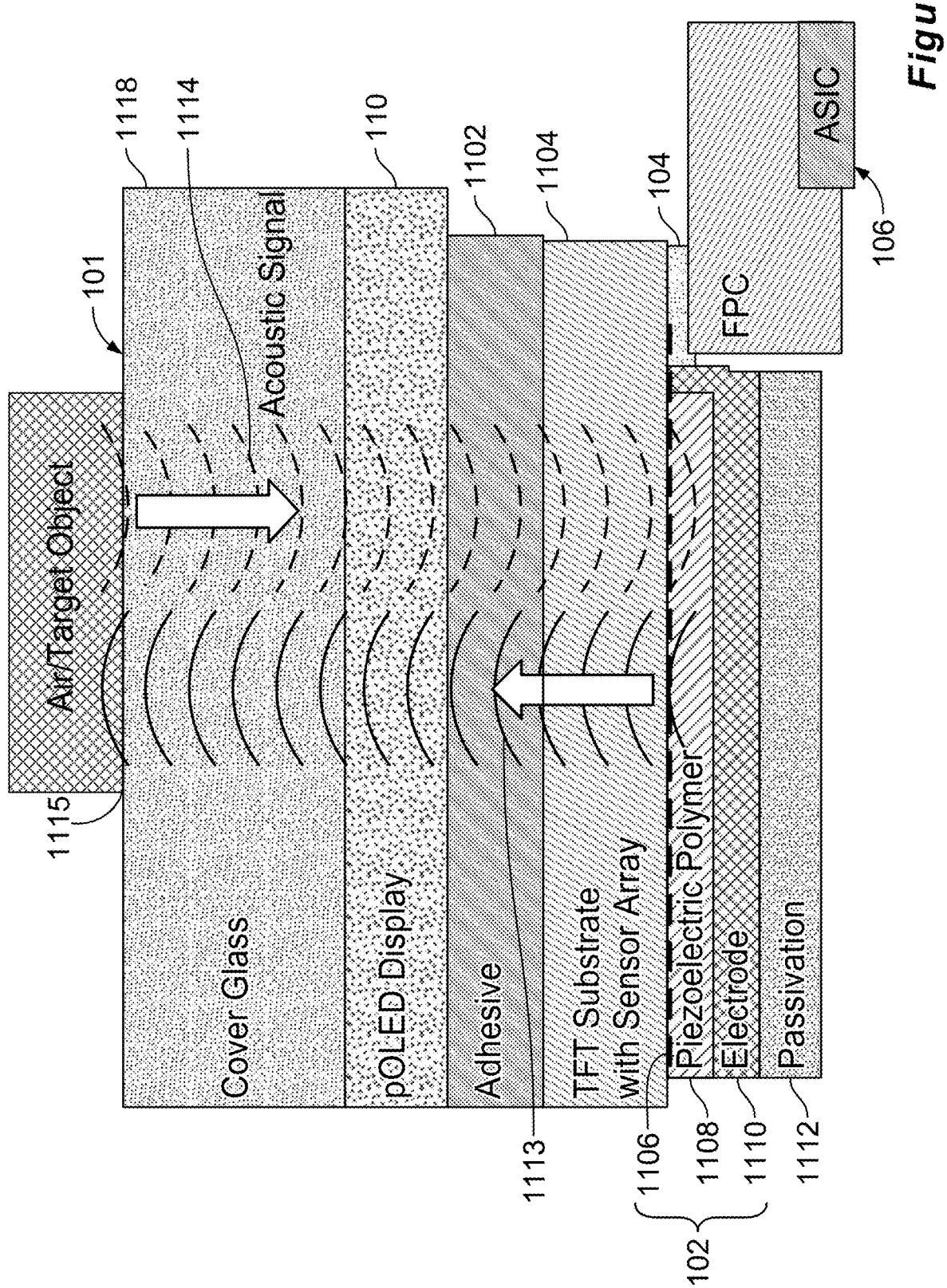
FIG. 11 shows example components of an apparatus according to some disclosed implementations.

FIG. 11 shows example components of an apparatus according to some disclosed implementations. As with other disclosed implementations, the types, number and arrangement of elements, as well as the dimensions of elements, are merely examples. According to this example, the apparatus 101 is configured to perform at least some of the methods disclosed herein. According to this implementation, the fingerprint sensor system 102 is an ultrasonic sensor system that includes a piezoelectric layer 1108, an electrode layer 1110 on one side of the piezoelectric layer 1108 and an array of sensor pixels 1106 on a second and opposing side of the piezoelectric layer 1108. In this implementation, the piezoelectric layer 1108 is an ultrasonic transceiver layer that includes one or more piezoelectric polymers.

According to this example, the electrode layer 1110 resides between a passivation layer 1112 and the piezoelectric layer 1108. In some examples, passivation layer 1112 may include an adhesive, such as an epoxy film, a polymer layer (such as a polyethylene terephthalate (PET) layer), etc.

In this example the TFT layer 1104 includes a TFT substrate and circuitry for the array of sensor pixels 1106. The TFT layer 1104 may be a type of metal-oxide-semiconductor field-effect transistor (MOSFET) made by depositing thin films of an active semiconductor layer as well as a dielectric layer and metallic contacts over a TFT substrate. In some examples, the TFT substrate may be a non-conductive material such as glass.

In this example, the apparatus 101 includes a display system 110, which includes an OLED display in this instance. Here, the OLED display is attached to the TFT layer 1104 via an adhesive layer 1102.

According to this implementation, the TFT layer 1104, the array of sensor pixels 1106 and the electrode are electrically coupled to at least a portion of the control system 106 and one side of the ultrasonic transceiver layer 101 via a portion of the interface system 104, which includes electrically conducting material and a flexible printed circuit (FPC) in this instance.

In this example, the apparatus 101 is configured to perform at least some of the methods disclosed herein. In this example, the control system 106 is configured to control the ultrasonic sensor system to transmit one or more ultrasonic waves 1113. According to this example, the ultrasonic wave(s) 1113 are transmitted through the TFT layer 1104, the OLED display and the cover 108. According to this example, reflections 1114 of the ultrasonic wave(s) 1113 are caused by acoustic impedance contrast at (or near) the interface 1115 between the outer surface of the cover 1118 and whatever is in contact with the outer surface, which may be air or the surface of a target object, such as the ridges and valleys of a fingerprint, etc. (As used herein, the term "finger" may refer to any digit, including a thumb. Accordingly, a thumbprint will be considered a type of "fingerprint.")

According to some examples, reflections 1114 of the ultrasonic wave(s) 1113 may be used to estimate the body temperature of a person whose finger is on an outer surface of the apparatus 101, e.g., on the cover 1118. In some such examples, the reflections 1114 may be detected by the electrode layer 1110. Corresponding ultrasonic signals may be provided to the control system 106. In some such implementations, reflections 1114 corresponding to a cover/air interface may be detected by the electrode layer 1110 and corresponding background ultrasonic signals may be provided to the control system 106. In some such implementations, ultrasonic signals that are used by the control system 106 for fingerprint-based authentication may be based on reflections 1114 from a cover/finger interface that are detected by the array of sensor pixels 1106.

Figure 12:
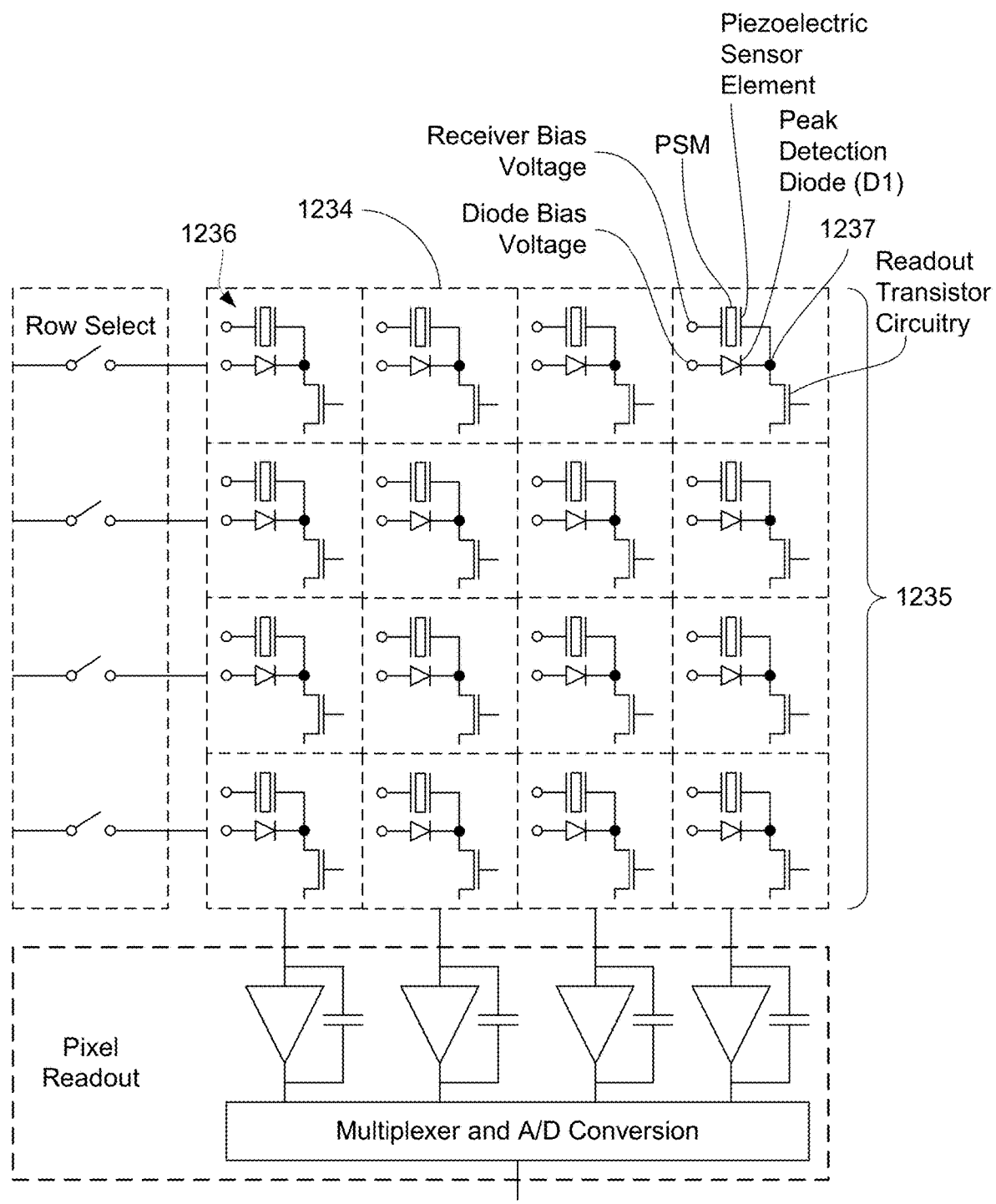
FIG. 12 representationally depicts aspects of a 4×4 pixel array of sensor pixels for an ultrasonic sensor system.

FIG. 12 representationally depicts aspects of a 4×4 pixel array of sensor pixels for an ultrasonic sensor system. Each pixel 1234 may be, for example, associated with a local region of piezoelectric sensor material (PSM), a peak detection diode (D1) and a readout transistor (M3); many or all of these elements may be formed on or in a substrate to form the pixel circuit 1236. In practice, the local region of piezoelectric sensor material of each pixel 1234 may transduce received ultrasonic energy into electrical charges. The peak detection diode D1 may register the maximum amount of charge detected by the local region of piezoelectric sensor material PSM. Each row of the pixel array 1235 may then be scanned, e.g., through a row select mechanism, a gate driver, or a shift register, and the readout transistor M3 for each column may be triggered to allow the magnitude of the peak charge for each pixel 1234 to be read by additional circuitry, e.g., a multiplexer and an A/D converter. The pixel circuit 1236 may include one or more TFTs to allow gating, addressing, and resetting of the pixel 1234.

Each pixel circuit 1236 may provide information about a small portion of the object detected by the ultrasonic sensor system. While, for convenience of illustration, the example shown in FIG. 12 is of a relatively coarse resolution, ultrasonic sensors having a resolution on the order of 500 pixels per inch or higher may be configured with an appropriately scaled structure. The detection area of the ultrasonic sensor system may be selected depending on the intended object of detection. For example, the detection area may range from about 5 mm×5 mm for a single finger to about 3 inches×3 inches for four fingers. Smaller and larger areas, including square, rectangular and non-rectangular geometries, may be used as appropriate for the target object.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module which may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those having ordinary skill in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein, if at all, to mean "serving as an example, instance, or illustration." Any implementation described herein as "exemplary" is not necessarily to be construed as preferred or advantageous over other implementations.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

It will be understood that unless features in any of the particular described implementations are expressly identified as incompatible with one another or the surrounding context implies that they are mutually exclusive and not readily combinable in a complementary and/or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

Implementation examples are described in the following numbered clauses:

1. An apparatus, comprising:
   a fingerprint sensor system;
   a display system including at least one display;
   a memory configured for storing fingerprint authentication cases, each of the fingerprint authentication cases corresponding to one or more fingerprints used during an authentication process, the fingerprint authentication cases including a plurality of multiple-fingerprint authentication cases for which two or more fingerprints are used during the authentication process, wherein the fingerprint authentication cases are based on fingerprints of individual digits and combinations of fingerprints from multiple digits obtained during an enrollment process; and
   a control system electrically connected with the fingerprint sensor system and the memory, the control system configured to:
   randomly or pseudo-randomly select one of the fingerprint authentication cases;
   determine whether a selected fingerprint authentication case is a multiple-fingerprint authentication case;
   upon determining that the selected fingerprint authentication case is a multiple-fingerprint authentication case, control the display system to provide a multiple-fingerprint authentication graphical user interface (GUI), the multiple-fingerprint authentication GUI indicating at least two digit placement areas corresponding with a fingerprint sensor system area;
   control the fingerprint sensor system to obtain fingerprint sensor data corresponding to each of the at least two digit placement areas; and
   perform the authentication process based, at least in part, on the fingerprint sensor data.

2. The apparatus of clause 1, wherein the authentication process involves a determination of one or more of relative digit placement, digit rotation, digit angular orientation or digit scaling.

3. The apparatus of clause 1 or clause 2, wherein the multiple-fingerprint authentication GUI includes digit information regarding which digit a user should place in each of the at least two digit placement areas.

4. The apparatus of clause 3, wherein the digit information includes a digit identification label on or adjacent to each of the at least two digit placement areas.

5. The apparatus of any one of clauses 1-4, wherein the fingerprint sensor system area comprises an ultrasonic fingerprint sensor area.

6. The apparatus of clause 5, further comprising a cover glass proximate a first side of the at least one display, wherein at least a portion of the ultrasonic fingerprint sensor area is proximate a second side of the at least one display, the second side being an opposite side relative to the first side.

7. The apparatus of any one of clauses 1-6, wherein the multiple-fingerprint authentication GUI includes hand information indicating a hand corresponding to digits a user should place in the at least two digit placement areas.

8. The apparatus of any one of clauses 1-7, wherein the control system is further configured for performing a hand determination process that involves determining whether digits placed in the at least two digit placement areas correspond to a right hand or a left hand.

9. The apparatus of clause 8, wherein the hand determination process is based, at least in part, on the fingerprint sensor data corresponding to at least two digit placement areas.

10. The apparatus of clause 8, wherein the hand determination process is based, at least in part, on inertial sensor data from an inertial sensor system.

11. The apparatus of any one of clauses 1-10, wherein the control system is further configured for controlling the display system to provide one or more GUIs for a multiple-fingerprint enrollment process.

12. The apparatus of clause 11, wherein at least one of the one or more GUIs for the multiple-fingerprint enrollment process includes a user interface for indicating a hand from which fingerprint sensor data will be obtained.

13. The apparatus of clause 11, wherein at least one of the one or more GUIs for the multiple-fingerprint enrollment process includes a user interface for identifying a digit from which fingerprint sensor data will be obtained or from which fingerprint sensor data has been obtained.

14. The apparatus of clause 11, wherein at least one of the one or more GUIs for the multiple-fingerprint enrollment process includes at least two digit placement areas for simultaneously obtaining fingerprint sensor data from at least two digits.

15. The apparatus of any one of clauses 1-14, wherein controlling the fingerprint sensor system to obtain the fingerprint sensor data involves obtaining the fingerprint sensor data from target objects that are simultaneously presented in the at least two digit placement areas.

16. The apparatus of any one of clauses 1-15, wherein the fingerprint authentication cases include one or more single-fingerprint authentication cases.

17. The apparatus of any one of clauses 1-16, wherein the control system is further configured to use a randomly or pseudo-randomly selected fingerprint authentication case until after a successful authentication process involving the randomly or pseudo-randomly selected fingerprint authentication case.

18. The apparatus of any one of clauses 1-17, wherein the control system is further configured to randomly or pseudo-randomly select another fingerprint authentication case during a subsequent authentication process after a successful authentication process.

19. The apparatus of any one of clauses 1-18, wherein randomly or pseudo-randomly selecting fingerprint authentication cases is part of an enhanced security authentication process and wherein the control system is further configured for controlling the display system to provide a GUI for enabling or disabling the enhanced security authentication process.

20. The apparatus of any one of clauses 1-19, wherein the fingerprint sensor system is, or includes, an optical fingerprint sensor system.

21. An authentication method, comprising:
randomly or pseudo-randomly selecting, by a control system, one fingerprint authentication case from a plurality of fingerprint authentication cases stored in a memory, each of the fingerprint authentication cases corresponding to one or more fingerprints used during an authentication process, the fingerprint authentication cases including a plurality of multiple-fingerprint authentication cases for which two or more fingerprints are used during the authentication process, wherein the fingerprint authentication cases are based on fingerprints of individual digits and combinations of fingerprints from multiple digits obtained during an enrollment process;

determining whether a selected fingerprint authentication case is a multiple-fingerprint authentication case;

upon determining that the selected fingerprint authentication case is a multiple-fingerprint authentication case, controlling a display system to provide a multiple-fingerprint authentication graphical user interface (GUI), the multiple-fingerprint authentication GUI indicating at least two digit placement areas corresponding with a fingerprint sensor system area of a fingerprint sensor system;

controlling the fingerprint sensor system to obtain fingerprint sensor data corresponding to each of the at least two digit placement areas; and performing the authentication process based, at least in part, on the fingerprint sensor data.

22. The method of clause 21, wherein the authentication process involves a determination of one or more of relative digit placement, digit rotation, digit angular orientation or digit scaling.

23. The method of clause 21 or clause 22, wherein the multiple-fingerprint authentication GUI includes digit information regarding which digit a user should place in each of the at least two digit placement areas.

24. The method of clause 23, wherein the digit information includes a digit identification label on or adjacent to each of the at least two digit placement areas.

25. The method of any one of clauses 21-24, wherein the multiple-fingerprint authentication GUI includes hand information indicating a hand corresponding to digits a user should place in the at least two digit placement areas.

26. The method of any one of clauses 21-25, further comprising performing a hand determination process that involves determining whether digits placed in the at least two digit placement areas correspond to a right hand or a left hand.

27. The method of clause 26, wherein the hand determination process is based, at least in part, on the fingerprint sensor data corresponding to at least two digit placement areas.

28. The method of clause 26, wherein the hand determination process is based, at least in part, on inertial sensor data from an inertial sensor system.

29. The method of any one of clauses 21-28, wherein controlling the fingerprint sensor system to obtain the fingerprint sensor data involves obtaining the fingerprint sensor data from target objects that are simultaneously presented in the at least two digit placement areas.

30. The method of any one of clauses 21-29, further comprising continuing to use a randomly or pseudo-randomly selected fingerprint authentication case until after a successful authentication process involving the randomly or pseudo-randomly selected fingerprint authentication case.

31. The method of any one of clauses 21-30, further comprising randomly or pseudo-randomly selecting another fingerprint authentication case during a subsequent authentication process after a successful authentication process.

32. The method of any one of clauses 21-31, wherein randomly or pseudo-randomly selecting the fingerprint authentication case is part of an enhanced security authentication process and wherein the method further involves controlling the display system to provide a GUI for enabling or disabling the enhanced security authentication process.

33. One or more non-transitory media having software stored thereon, the software including instructions for controlling one or more devices to perform an authentication method, the authentication method comprising:
  randomly or pseudo-randomly selecting, by a control system, one fingerprint authentication case from a plurality of fingerprint authentication cases stored in a memory, each of the fingerprint authentication cases corresponding to one or more fingerprints used during an authentication process, the fingerprint authentication cases including a plurality of multiple-fingerprint authentication cases for which two or more fingerprints are used during the authentication process, wherein the fingerprint authentication cases are based on fingerprints of individual digits and combinations of fingerprints from multiple digits obtained during an enrollment process;
  determining whether a selected fingerprint authentication case is a multiple-fingerprint authentication case;
  upon determining that the selected fingerprint authentication case is a multiple-fingerprint authentication case, controlling a display system to provide a multiple-fingerprint authentication graphical user interface (GUI), the multiple-fingerprint authentication GUI indicating at least two digit placement areas corresponding with a fingerprint sensor system area of a fingerprint sensor system;
  controlling the fingerprint sensor system to obtain fingerprint sensor data corresponding to each of the at least two digit placement areas; and
  performing the authentication process based, at least in part, on the fingerprint sensor data.

34. The one or more non-transitory media of clause 33, wherein the authentication process involves a determination of one or more of relative digit placement, digit rotation, digit angular orientation or digit scaling.

35. The one or more non-transitory media of clause 33 or clause 34, wherein the multiple-fingerprint authentication GUI includes digit information regarding which digit a user should place in each of the at least two digit placement areas.

36. The one or more non-transitory media of any one of clauses 33-35, wherein the multiple-fingerprint authentication GUI includes hand information indicating a hand corresponding to digits a user should place in the at least two digit placement areas.

37. An apparatus, comprising:
  a fingerprint sensor system;
  a display system including at least one display;
  a memory configured for storing fingerprint authentication cases, each of the fingerprint authentication cases corresponding to one or more fingerprints used during an authentication process, the fingerprint authentication cases including a plurality of multiple-fingerprint authentication cases for which two or more fingerprints are used during the authentication process, wherein the fingerprint authentication cases are based on fingerprints of individual digits and combinations of fingerprints from multiple digits obtained during an enrollment process; and
  control means for:
    randomly or pseudo-randomly selecting one of the fingerprint authentication cases;
    determining whether a selected fingerprint authentication case is a multiple-fingerprint authentication case;
    upon determining that the selected fingerprint authentication case is a multiple-fingerprint authentication case, controlling the display system to provide a multiple-fingerprint authentication graphical user interface (GUI), the multiple-fingerprint authentication GUI indicating at least two digit placement areas corresponding with a fingerprint sensor system area;
    controlling the fingerprint sensor system to obtain fingerprint sensor data corresponding to each of the at least two digit placement areas; and
    performing the authentication process based, at least in part, on the fingerprint sensor data.

38. The apparatus of clause 37, wherein the authentication process involves a determination of one or more of relative digit placement, digit rotation, digit angular orientation or digit scaling.

39. The apparatus of clause 37 or clause 38, wherein the multiple-fingerprint authentication GUI includes digit information regarding which digit a user should place in each of the at least two digit placement areas.

40. The apparatus of clause 39, wherein the digit information includes a digit identification label on or adjacent to each of the at least two digit placement areas.

41. The apparatus of any one of clauses 37-40, wherein the fingerprint sensor system area comprises an ultrasonic fingerprint sensor area.

42. The apparatus of clause 41, further comprising a cover glass proximate a first side of the at least one display, wherein at least a portion of the ultrasonic fingerprint sensor area is proximate a second side of the at least one display, the second side being an opposite side relative to the first side.

43. The apparatus of any one of clauses 37-42, wherein the fingerprint sensor system is, or includes, an optical fingerprint sensor system.

The invention claimed is:

1. An apparatus, comprising:
  a fingerprint sensor system including an optical fingerprint sensor system, an ultrasonic fingerprint sensor system or a combination thereof;
  a display system including at least one display;
  a memory configured for storing fingerprint authentication cases, each of the fingerprint authentication cases corresponding to one or more fingerprints used during an authentication process, the fingerprint authentication cases including a plurality of multiple-fingerprint authentication cases for which two or more fingerprints are used during the authentication process, wherein the fingerprint authentication cases are based on fingerprints of individual digits and combinations of fingerprints from multiple digits obtained during an enrollment process; and
  a control system electrically connected with the fingerprint sensor system and the memory, the control system including one or more general purpose single- or multi-chip processors, one or more digital signal processors (DSPs), one or more application specific integrated circuits (ASICs), one or more field programmable gate arrays (FPGAs) or other programmable logic devices, one or more discrete gates or transistor logic, one or more discrete hardware components, or combinations thereof, the control system being configured to:
    randomly or pseudo-randomly select one of the fingerprint authentication cases;
    determine whether a selected fingerprint authentication case is a multiple-fingerprint authentication case;
    upon determining that the selected fingerprint authentication case is a multiple-fingerprint authentication case, control the display system to provide a multiple-fingerprint authentication graphical user interface (GUI), the multiple-fingerprint authentication GUI indicating at least two digit placement areas corresponding with a fingerprint sensor system area;

control the fingerprint sensor system to obtain fingerprint sensor data corresponding to each of the at least two digit placement areas;

perform the authentication process based, at least in part, on the fingerprint sensor data;

determine whether the authentication process is a successful authentication process or an unsuccessful authentication process;

responsive to determining that the authentication process is an unsuccessful authentication process use the selected fingerprint authentication case for a next authentication process; and responsive to determining that the authentication process is a successful authentication process, randomly or pseudo-randomly select one of the fingerprint authentication cases for the next authentication process.

2. The apparatus of claim 1, wherein the authentication process involves a determination of one or more of relative digit placement, digit rotation, digit angular orientation or digit scaling.

3. The apparatus of claim 1, wherein the multiple-fingerprint authentication GUI includes digit information regarding which digit a user should place in each of the at least two digit placement areas.

4. The apparatus of claim 3, wherein the digit information includes a digit identification label on or adjacent to each of the at least two digit placement areas.

5. The apparatus of claim 1, wherein the fingerprint sensor system area comprises an ultrasonic fingerprint sensor area.

6. The apparatus of claim 5, further comprising a cover glass proximate a first side of the at least one display, wherein at least a portion of the ultrasonic fingerprint sensor area is proximate a second side of the at least one display, the second side being an opposite side relative to the first side.

7. The apparatus of claim 1, wherein the multiple-fingerprint authentication GUI includes hand information indicating a hand corresponding to digits a user should place in the at least two digit placement areas.

8. The apparatus of claim 1, wherein the control system is further configured for performing a hand determination process that involves determining whether digits placed in the at least two digit placement areas correspond to a right hand or a left hand.

9. The apparatus of claim 8, wherein the hand determination process is based, at least in part, on the fingerprint sensor data corresponding to at least two digit placement areas.

10. The apparatus of claim 8, wherein the hand determination process is based, at least in part, on inertial sensor data from an inertial sensor system.

11. The apparatus of claim 1, wherein the control system is further configured for controlling the display system to provide one or more GUIs for a multiple-fingerprint enrollment process.

12. The apparatus of claim 11, wherein at least one of the one or more GUIs for the multiple-fingerprint enrollment process includes a user interface for indicating a hand from which fingerprint sensor data will be obtained.

13. The apparatus of claim 11, wherein at least one of the one or more GUIs for the multiple-fingerprint enrollment process includes a user interface for identifying a digit from which fingerprint sensor data will be obtained or from which fingerprint sensor data has been obtained.

14. The apparatus of claim 11, wherein at least one of the one or more GUIs for the multiple-fingerprint enrollment process includes at least two digit placement areas for simultaneously obtaining fingerprint sensor data from at least two digits.

15. The apparatus of claim 1, wherein controlling the fingerprint sensor system to obtain the fingerprint sensor data involves obtaining the fingerprint sensor data from target objects that are simultaneously presented in the at least two digit placement areas.

16. The apparatus of claim 1, wherein the fingerprint authentication cases include one or more single-fingerprint authentication cases.

17. The apparatus of claim 1, wherein randomly or pseudo-randomly selecting fingerprint authentication cases is part of an enhanced security authentication process and wherein the control system is further configured for controlling the display system to provide a GUI for enabling or disabling the enhanced security authentication process.

18. An authentication method, comprising:

randomly or pseudo-randomly selecting, by a control system, one fingerprint authentication case from a plurality of fingerprint authentication cases stored in a memory, each of the fingerprint authentication cases corresponding to one or more fingerprints used during an authentication process, the fingerprint authentication cases including a plurality of multiple-fingerprint authentication cases for which two or more fingerprints are used during the authentication process, wherein the fingerprint authentication cases are based on fingerprints of individual digits and combinations of fingerprints from multiple digits obtained during an enrollment process;

determining whether a selected fingerprint authentication case is a multiple-fingerprint authentication case;

upon determining that the selected fingerprint authentication case is a multiple-fingerprint authentication case, controlling a display system to provide a multiple-fingerprint authentication graphical user interface (GUI), the multiple-fingerprint authentication GUI indicating at least two digit placement areas corresponding with a fingerprint sensor system area of a fingerprint sensor system;

controlling the fingerprint sensor system to obtain fingerprint sensor data corresponding to each of the at least two digit placement areas;

performing the authentication process based, at least in part, on the fingerprint sensor data;

determining whether the authentication process is a successful authentication process or an unsuccessful authentication process; and responsive to determining that the authentication process is a successful or an unsuccessful authentication process, either use the selected fingerprint authentication case for a next authentication process or randomly or pseudo-randomly select one of the fingerprint authentication cases for the next authentication process.

19. The method of claim 18, wherein the authentication process involves a determination of one or more of relative digit placement, digit rotation, digit angular orientation or digit scaling.

20. The method of claim 18, wherein the multiple-fingerprint authentication GUI includes digit information regarding which digit a user should place in each of the at least two digit placement areas.

21. The method of claim 20, wherein the digit information includes a digit identification label on or adjacent to each of the at least two digit placement areas.

22. The method of claim 18, wherein the multiple-fingerprint authentication GUI includes hand information indicating a hand corresponding to digits a user should place in the at least two digit placement areas.

23. The method of claim 18, further comprising performing a hand determination process that involves determining whether digits placed in the at least two digit placement areas correspond to a right hand or a left hand.

24. The method of claim 23, wherein the hand determination process is based, at least in part, on the fingerprint sensor data corresponding to at least two digit placement areas.

25. The method of claim 23, wherein the hand determination process is based, at least in part, on inertial sensor data from an inertial sensor system.

26. The method of claim 18, wherein controlling the fingerprint sensor system to obtain the fingerprint sensor data involves obtaining the fingerprint sensor data from target objects that are simultaneously presented in the at least two digit placement areas.

27. The method of claim 18, wherein randomly or pseudo-randomly selecting the fingerprint authentication case is part of an enhanced security authentication process and wherein the method further involves controlling the display system to provide a GUI for enabling or disabling the enhanced security authentication process.

28. One or more non-transitory media having software stored thereon, the software including instructions for controlling one or more devices to perform an authentication method, the authentication method comprising:
    randomly or pseudo-randomly selecting, by a control system including one or more general purpose single- or multi-chip processors, one or more digital signal processors (DSPs), one or more application specific integrated circuits (ASICs), one or more field programmable gate arrays (FPGAs) or other programmable logic devices, one or more discrete gates or transistor logic, one or more discrete hardware components, or combinations thereof, one fingerprint authentication case from a plurality of fingerprint authentication cases stored in a memory, each of the fingerprint authentication cases corresponding to one or more fingerprints used during an authentication process, the fingerprint authentication cases including a plurality of multiple-fingerprint authentication cases for which two or more fingerprints are used during the authentication process, wherein the fingerprint authentication cases are based on fingerprints of individual digits and combinations of fingerprints from multiple digits obtained during an enrollment process;
    determining whether a selected fingerprint authentication case is a multiple-fingerprint authentication case;
    upon determining that the selected fingerprint authentication case is a multiple-fingerprint authentication case, controlling a display system including at least on display to provide a multiple-fingerprint authentication graphical user interface (GUI), the multiple-fingerprint authentication GUI indicating at least two digit placement areas corresponding with a fingerprint sensor system area of a fingerprint sensor system including an optical fingerprint sensor system, an ultrasonic fingerprint sensor system or a combination thereof;
    controlling the fingerprint sensor system to obtain fingerprint sensor data corresponding to each of the at least two digit placement areas;
    performing the authentication process based, at least in part, on the fingerprint sensor data;
    determining whether the authentication process is a successful authentication process or an unsuccessful authentication process; and
    responsive to determining that the authentication process is a successful or an unsuccessful authentication process, either use the selected fingerprint authentication case for a next authentication process or randomly or pseudo-randomly select one of the fingerprint authentication cases for the next authentication process.

29. The one or more non-transitory media of claim 28, wherein the authentication process involves a determination of one or more of relative digit placement, digit rotation, digit angular orientation or digit scaling.

30. The one or more non-transitory media of claim 28, wherein the multiple-fingerprint authentication GUI includes digit information regarding which digit a user should place in each of the at least two digit placement areas.

31. The one or more non-transitory media of claim 28, wherein the multiple-fingerprint authentication GUI includes hand information indicating a hand corresponding to digits a user should place in the at least two digit placement areas.

32. An apparatus, comprising:
    a fingerprint sensor system including an optical fingerprint sensor system, an ultrasonic fingerprint sensor system or a combination thereof;
    a display system including at least one display;
    a memory configured for storing fingerprint authentication cases, each of the fingerprint authentication cases corresponding to one or more fingerprints used during an authentication process, the fingerprint authentication cases including a plurality of multiple-fingerprint authentication cases for which two or more fingerprints are used during the authentication process, wherein the fingerprint authentication cases are based on fingerprints of individual digits and combinations of fingerprints from multiple digits obtained during an enrollment process; and
    control means for:
        randomly or pseudo-randomly selecting one of the fingerprint authentication cases;
        determining whether a selected fingerprint authentication case is a multiple-fingerprint authentication case;
        upon determining that the selected fingerprint authentication case is a multiple-fingerprint authentication case, controlling the display system to provide a multiple-fingerprint authentication graphical user interface (GUI), the multiple-fingerprint authentication GUI indicating at least two digit placement areas corresponding with a fingerprint sensor system area;
        controlling the fingerprint sensor system to obtain fingerprint sensor data corresponding to each of the at least two digit placement areas;
        performing the authentication process based, at least in part, on the fingerprint sensor data;
        determining whether the authentication process is a successful authentication process or an unsuccessful authentication process;
        responsive to determining that the authentication process is an unsuccessful authentication process using the selected fingerprint authentication case for a next authentication process; and responsive to determining that the authentication process is a successful authentication process, randomly or pseudo-randomly selecting one of the fingerprint authentication cases for the next authentication process.

33. The apparatus of claim 32, wherein the authentication process involves a determination of one or more of relative digit placement, digit rotation, digit angular orientation or digit scaling.

34. The apparatus of claim 32, wherein the multiple-fingerprint authentication GUI includes digit information regarding which digit a user should place in each of the at least two digit placement areas.

35. The apparatus of claim 34, wherein the digit information includes a digit identification label on or adjacent to each of the at least two digit placement areas.

36. The apparatus of claim 32, wherein the fingerprint sensor system area comprises an ultrasonic fingerprint sensor area.

37. The apparatus of claim 36, further comprising a cover glass proximate a first side of the at least one display, wherein at least a portion of the ultrasonic fingerprint sensor area is proximate a second side of the at least one display, the second side being an opposite side relative to the first side.

38. The apparatus of claim 32, wherein the fingerprint sensor system is, or includes, an optical fingerprint sensor system.

* * * * *